United States Patent [19]

Ozawa et al.

[11] Patent Number: 5,182,117
[45] Date of Patent: Jan. 26, 1993

[54] HEATING AND COOLING UNIT

[75] Inventors: Koichi Ozawa, Susono; Hajime Abe, Zama; Yutaka Owashi, Numazu, all of Japan

[73] Assignee: Toshiba Machine Co., Ltd., Tokyo, Japan

[21] Appl. No.: 691,077

[22] Filed: Apr. 25, 1991

[30] Foreign Application Priority Data

| Apr. 26, 1990 | [JP] | Japan | 2-108867 |
| Apr. 26, 1990 | [JP] | Japan | 2-108868 |
| Apr. 26, 1990 | [JP] | Japan | 2-108869 |

[51] Int. Cl.$^5$ .............. B29C 33/02; B29C 35/02; B29C 43/52; B29C 45/73
[52] U.S. Cl. .................... 425/144; 425/384; 425/407; 425/547; 425/DIG. 110; 425/DIG. 246; 264/40.6; 264/328.16
[58] Field of Search ............... 425/143, 144, 526, 547, 425/552, 384, 407, DIG. 110, DIG. 246, 378.1; 264/40.6, 328.16

[56] References Cited

U.S. PATENT DOCUMENTS

| 3,525,098 | 8/1970 | Vox | 425/547 |
| 3,891,370 | 6/1975 | Giehler | 425/144 |
| 4,621,678 | 11/1986 | Hahn et al. | 425/144 |
| 4,902,454 | 2/1990 | Steinbichler et al. | 425/552 |

FOREIGN PATENT DOCUMENTS

| 56-55219 | 5/1981 | Japan | 425/144 |
| 58-211405 | 12/1983 | Japan | 425/144 |
| 62-173218 | 7/1987 | Japan | 425/144 |
| 1-269515 | 10/1989 | Japan . | |

*Primary Examiner*—Jay H. Woo
*Assistant Examiner*—Khanh P. Nguyen
*Attorney, Agent, or Firm*—Oblon, Spivak, McClelland, Maier & Neustadt

[57] ABSTRACT

In a heating/cooling unit for selectively heating or cooling a set of dies, oil received in a reservoir is supplied to a flow direction changeover valve by a first oil pump. In a stably mode, oil is returned to the reservoir through the changeover valve and a heat exchanger. In a heating mode, the oil is supplied to a second oil pump from the changeover valve through a check valve. The second oil pump supplies the oil to an oil heater, and the heated oil is introduced into a fluid path formed in the dies to heat the dies. The oil discharged from the fluid path of the dies is returned to the second oil pump. Thus, the heated oil is circulated in a closed loop in the heating mode. In a cooling mode, new oil is supplied to the fluid path of the dies from the changeover valve and the oil discharged from the fluid path is guided to the heat exchanger through a switching valve and the cooling oil is returned to the reservoir.

6 Claims, 18 Drawing Sheets

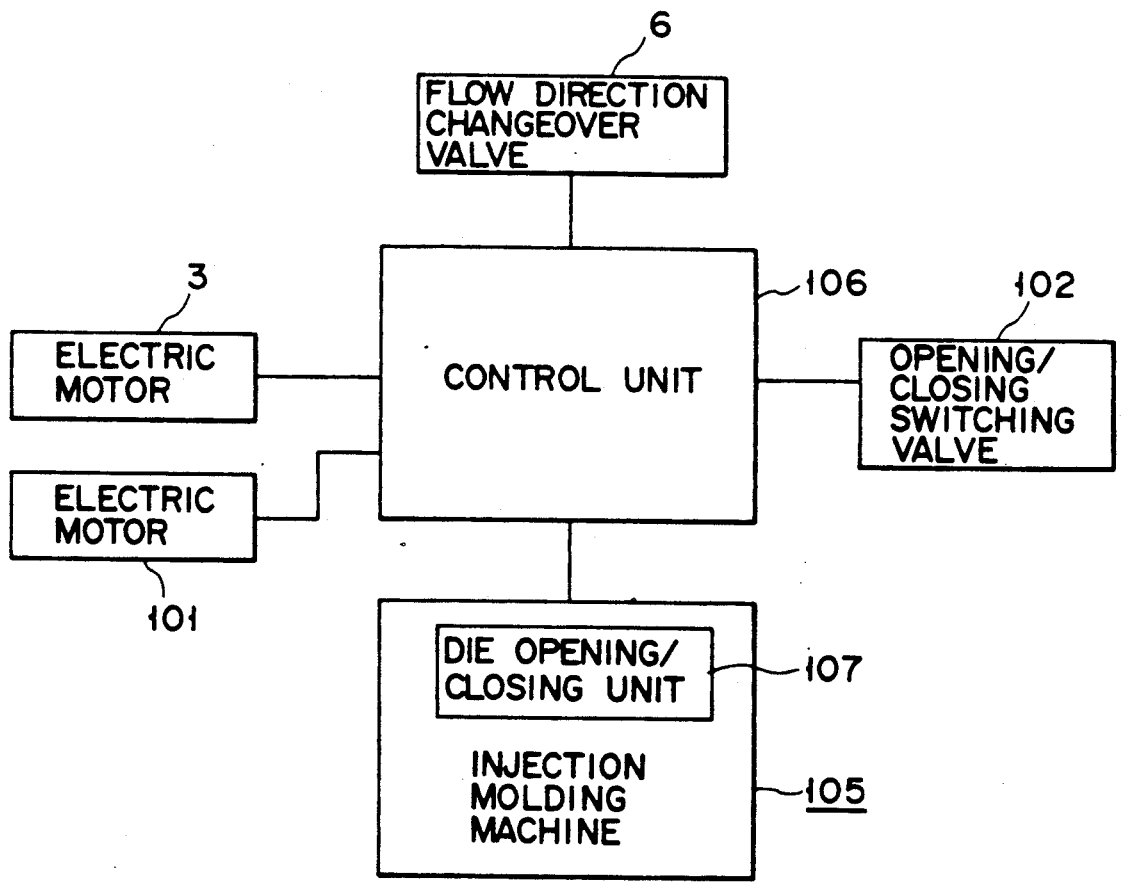
F I G. 3

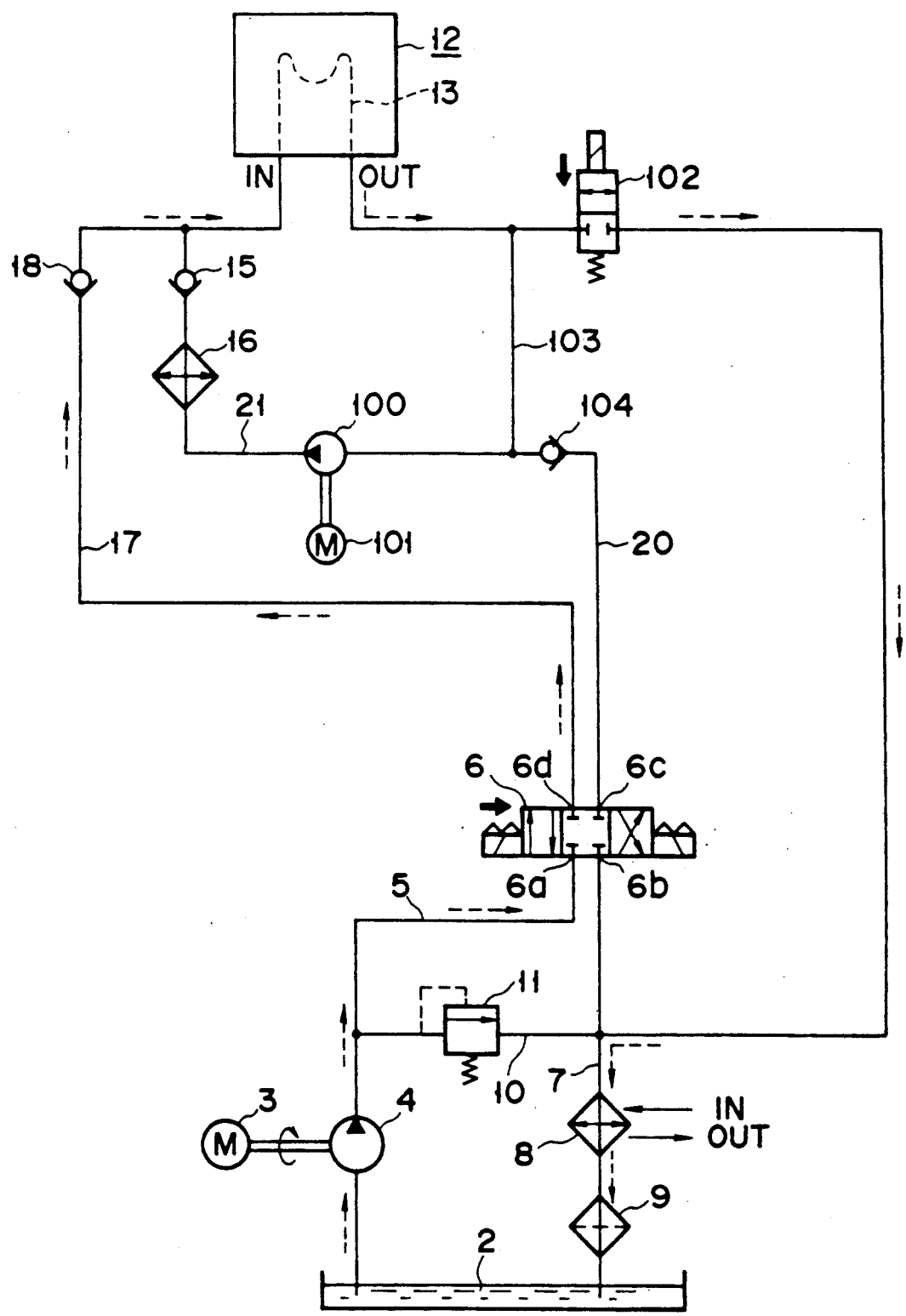
F I G. 6

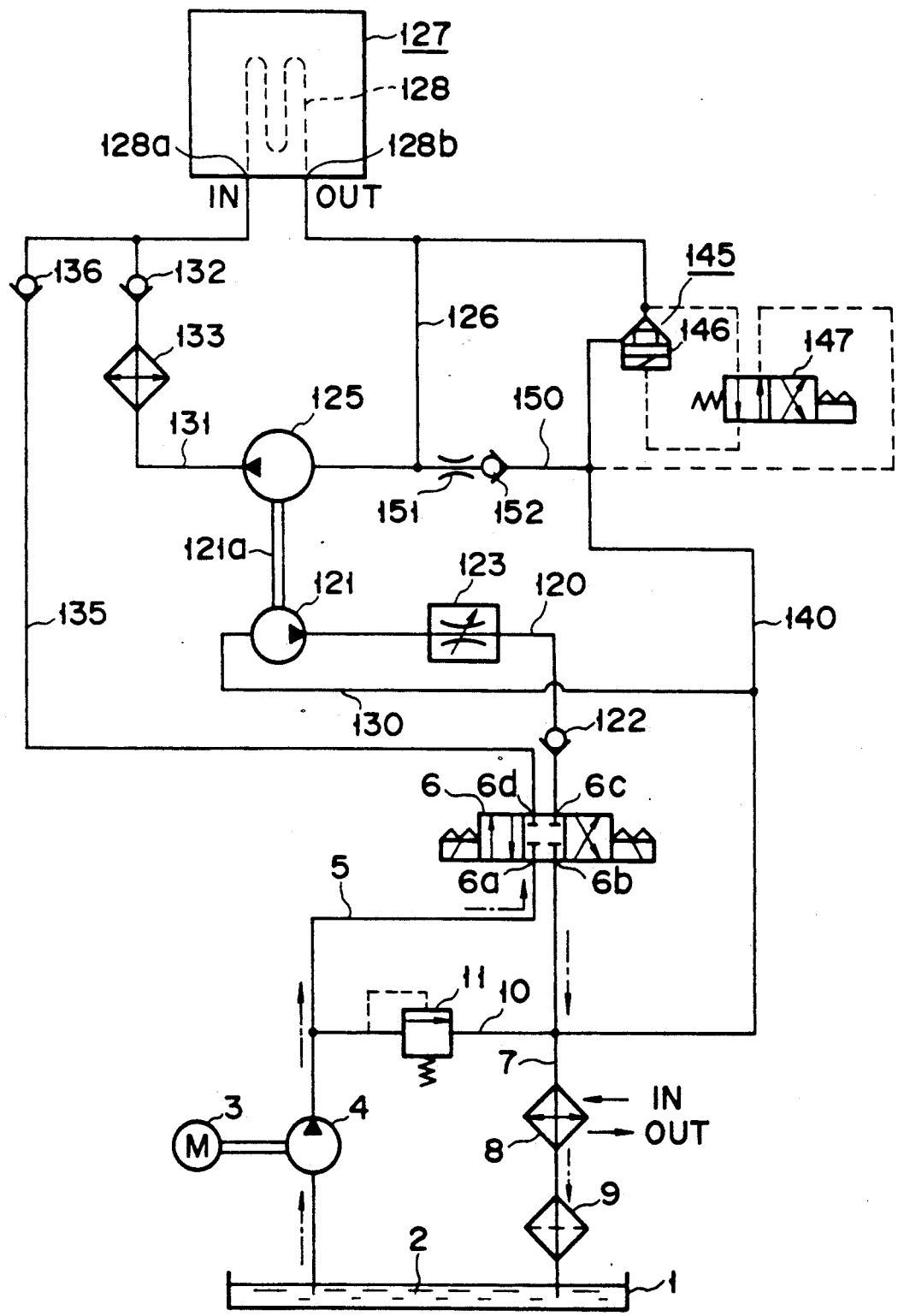
F I G. 8

HEATING AND COOLING UNIT

BACKGROUND OF THE INVENTION

1. Field of the Invention

The present invention relates to a heating/cooling unit to selectively either heat or cool a set of dies used with an injection molding machine, particularly to such a heating/cooling unit devised to render service with use of a medium such as oil for dies cooling or heating.

2. Description of the Related Art

Of late, a great variety of injection molding machines are undertaking in great numbers various jobs. Of these, some injection molding machines, each running with a set of dies applied at normal temperature are nowadays confronted with a problem that plastic melt injected into a cavity created inside the dies start to set midway in a fluidity cycle due to spontaneous cooling therein, whereby the products are subject to bearing on their surfaces streaks, namely weld marks in another term, thus resulting in undergoing qualitative degradation.

The occurrence of weld marks can be prevented by heating the portion of a set of dies where plastic melt runs therealong following an injection cycle. However, constantly heating a set of dies entails some change of die thermal distribution, with not only the molding conditions getting unstabilized but also the setting time and the time up to a product take-out cycle commonly incurring some increases. To avoid these problems, the conventional injection molding process goes with heating prior to injecting plastic melt into the cavity within the dies, and cooling the dies before their opening after plastic melt injection.

In the prior art, there was developed a die heating-/cooling unit for practical use, which runs, introducing heated oil as a thermal medium into the cavity within the dies in a die heating cycle, and in a die cooling cycle, likewise bringing cooled oil into said cavity.

FIG. 1 is a block diagram of such a conventional heating/cooling unit as referred to above, wherein 1 is a reservoir to contain oil 2, and the oil 2 in the reservoir is sucked up by an oil pump 4 which is driven by a motor 3. A discharge port of the oil pump 4 is connected to a first port 6a of a flow direction changeover valve 6 via a first oil path pipe 5 while a second port 6b of the flow direction changeover valve 6 has a first oil return pipe 7 coupled thereto to flow back the oil 2 in the reservoir 1, wherein halfway along the first oil return pipe 7, there are provided a heat exchanger 8 to cool the oil 2 on the way to return to the reservoir 1, and an oil filter 9. A third port 6c of the flow direction changeover valve 6 is maintained in fluid communication with an inlet 13a of an in-die fluid path 13 formed inside a set of dies 12 via a second oil path pipe 20 and a third oil path pipe 21. Mounted on a third oil path pipe are not only a first check valve 15 to prevent a flow of the oil 2 from inside the die set 12 but also an oil heater 16 which is located midway between the first check valve 15 and the flow direction changeover valve 6 to heat the oil 2.

Further between a fourth port 6d of the flow direction changeover valve, and an inlet 13a of the in-die oil path 13, a fourth oil path pipe 17 is installed to provide fluid communication. The fourth oil path pipe 17 is connected to the third oil path pipe 21 and is further mounted with a second check valve 18 to prevent a back flow of the oil 2 from inside the die set 12.

An outlet 13b of the in-die fluid path 13 is coupled to an inlet of an oil cooler through a second oil return path pipe 19. The second oil return path pipe 19 to flow back the oil from inside the die set 12 into the reservoir 1 is coupled to the first oil return path pipe 7. A relief pipe 10 is provided which branches off from the first oil path pipe 5 and is connected to the first oil return path pipe 7. A relief valve 11 is installed on the relief pipe 11 to regulate the fluid pressure over a range of 10 through 20 kg/cm$^2$ at the maximum. While the heating/cooling unit of such an arrangement as remarked above is maintained standing by, the oil 2 circulates in the direction of an arrow of a single dotted line in FIG. 1, getting cooled. More precisely with the mechanism of oil cooling, the motor 3 is driven with the flow direction changeover valve 6 held at a neutral position whereat the valve is kept deenergized, running the pump 4, whereby the oil 2 in the reservoir 1 is pumped up, flowing into the first oil path pipe 5. At this stage, the first oil path pipe 5 is blocked by the flow direction changeover valve 6 which is maintained at the neutral position, whereby along with the lapse of some time, the hydraulic pressure inside the first oil path pipe 5 goes up beyond a setpoint of the relief valve 11. Then, the oil 2 is forced to flow into the first oil return pipe 7 mounted with the heat exchanger 8 and the filter 9 through the relief pipe 10, thereby getting not only cooled by the heat exchanger 8 on the first oil return pipe 7 but also filtered with the filter 9 prior to the return to the reservoir 1. Therefore with the heating/cooling kept on, cooling of the oil 2 gets progressed.

In the process of heating the die set 12, the oil 12 is held circulating in the direction of an a solid line arrow, whereby the die set 12 is heated with heated oil. To be precise with the mechanism of heating the die set 12, driving the pump 4 with the right chamber of the flow direction changeover valve 6 energized concurs with sucking up cool oil 2 from the reservoir 1, with the oil 2 subsequently getting discharged from the third port 6c of the flow direction changeover valve 6 into the second oil path pipe 20, and then led into a third oil path pipe 21. Thus, the oil 2 is heated by an oil heater 16, and thereafter, the oil 2 flows into the in-die fluid path 13 via the check valve, transferring the energy of heat to the die set 12, whereby the die set 12 is heated up to a proper temperature where the occurrence of weld marks is not allowed.

In the meanwhile the oil 2 flowing out from an outlet 13b of the in-die oil path 13 is led into the first oil return pipe 7 by way of a second oil return pipe 19, whereby the oil gets not only cooled with the heat exchanger 8 but also filtered clean by the filter 9 prior to the return to the reservoir 1.

Further in the process of cooling the die set 12, the oil 2 is kept circulating in the direction of a broken line arrow in the figure, thereby the die set 12 is cooled with the oil 2 carrying coolness. Precisely with the mechanism of cooling the die set 12, driving the pump 4 with the left chamber of the flow direction changeover valve 6 energized coincides with pumping up cool oil 2 from the reservoir 1, subsequently discharging the oil into the fourth oil path 17 via the fourth port 6d, and then getting led into the in-die fluid path 13 via a second check valve 18, whereby the die set 12 is cooled. This results in quickly cooling a product molded within the cavity of the die set 12, following the injection of plastic melt, down to a temperature at which the product can be taken out with quickness.

Meanwhile the oil 2 flowing out from the outlet 13b of the in-die fluid path 13 is led into the first oil return pipe 7 via the second oil return pipe 19, whereby the oil 2 gets cooled with the heat exchanger 8 and then filtered clean with the filter 9 prior to the return to the reservoir 1.

Introducing a thermal medium into the in-die fluid path 13 inside the die set 12 as in the foregoing proved serviceable to selectively heat or cool the die set 12, whereby quality injection molding is assured with freedom from leaving behind welds in the surface of an molded product.

The conventional heating/cooling unit of a prior art is found failing to exhibit high efficiency over heating and cooling the oil 2, a thermal medium, with the result that much time is required to heat and cool the die set 12, and there comes up to the fore a problem over the failure to cut short the cycle time covering the process of injection molding and a job step of molded product take-out. It is further noted with the conventional heating/cooling unit that to undertake quick heating, the oil heater 16 with a large capacity is essential, and for quick cooling, the heat exchanger 8 owning a large capacity is required, and also that unless the pump 4 and the motor to drive thereof are provided each with a large capacity, the efficiency of oil heating and cooling worsen, resulting in impracticality to cut short the cycle time of an injection molding machine.

Analyzing such problems with the conventional heating/cooling unit and subsequent researches disclosed that the settlement of the following carries vital significance:

(1) With the conventional heating/cooling unit, the oil 2, a thermal medium is directly delivered to the oil heater 16 as cooled, with the efficiency of oil heating thus resulting in worsening, whereby it eaves behind an interference with high-speed oil heating over a very short span of time.

(2) Similarly to the case of heating referred to above, the oil 2 flowing out with a high temperature from the oil heater 16 is flowed back to the oil cooler 8 immediately after the passage through the in-die fluid path 13 so that the efficiency of oil cooling gets worse, whereby to make up for this, an oil cooler with a large capacity is required.

(3) Though energizing the motor 3 even with the flow direction changeover valve 6 kept at the neutral position drives the pump 4 thereby to suck up and discharge the oil 2, the oil 2 fails to circulate through a relief pipe 10 (a reservoir circuit) until the oil pressure is boosted up to a setpoint (10 through 20 kg/cm$^2$) of the relief valve 11, which must remain unchanged. To force-circulate the oil through the relief pipe, the motor 3 must be driven, with some waste of electric energy as a result.

(4) Shifting the flow direction changeover valve 6 from one position to another for the process of oil cooling takes place flowing back the oil 2 thus far staying in the oil heater 16 directly into the oil cooler 8, thus giving rise to a problem in combination with a preceding problem remarked in (2) above.

SUMMARY OF THE INVENTION

It an object of the present invention to provide a heating/cooling unit contrived capable of quickly heating and cooling a die set, as well as of cutting short the cycle time covering the process of injection molding and a job set of molded product take-out.

The heating/cooling unit of the present invention designed to introduce a thermal medium into an in-die fluid path formed within a die set, whereby the die set may be selectively heated or cooled, comprises:

thermal medium storage means to contain a thermal medium therein;

first pump means to suck up and discharge the thermal medium from inside the thermal medium storage means;

first oil path pipe to deliver the thermal medium discharged from the first pump means flow direction changeover valve means with first, second, third and fourth ports, which in standby mode preceding a die set heating mode, and wherein the first medium path pipe is coupled to the first port, delivers to the second port the thermal medium discharged from the first pump means, with the first and second ports held in fluid communication with each other, in the heating mode, delivers to the third port the thermal medium discharged from the first pump means, with the first and third ports kept in fluid communication with each other, and in a cooling mode, delivers to the fourth port the thermal medium discharged by the first pump means, with the first and fourth ports maintained in fluid communication with each other;

first thermal medium return pipe to flow back the thermal medium to the thermal medium storage means while connected to the second port of the flow direction changeover valve means;

cooling means installed on the first thermal medium return pipe to cool the thermal medium prior to return to the thermal medium storage means;

second thermal medium path pipe coupled to the fourth port of the flow direction changeover valve means to deliver the thermal medium from therefrom;

second pump means coupled to the flow direction changeover valve means through the second thermal medium path pipe, and which in the heating mode, runs to suck up and discharge the thermal medium from the flow direction changeover valve means;

third thermal medium path pipe to deliver the thermal medium discharged from the second pump means into an in-die fluid path of a die set;

first check valve means installed on the third thermal medium path pipe to prevent the thermal medium flowing out via the die set from flowing back;

heating means installed on the third thermal medium path pipe running between the first check valve means and the second pump means to heat the thermal medium;

fourth thermal medium path pipe providing fluid communication between the third port of the flow direction changeover valve mean and the in-die fluid path of the die set;

second check valve means installed on the fourth thermal medium path pipe to prevent from flowing back the thermal medium flowing out from the die set;

second thermal medium return pipe coupled to the first thermal medium return pipe to deliver the thermal medium from the in-die path of the die set to the cooling means;

opening/closing switching valve means installed on the second thermal medium return pipe, and which in the heating mode closes to prevent the thermal medium from flowing back, and in the cooling mode, opens to release a flow of the thermal medium;

fifth thermal medium path pipe to couple the second thermal medium return pipe extending between the in-die fluid path of the die set and the opening/closing switching valve means to the suction port of the second pump means on the second thermal medium path pipe; and control means to control in the die-set heating mode the flow direction changeover valve means, second pump means, opening/closing switching valve means and so forth in a manner to set up a thermal medium circulating circuit with the second pump means, heating means, first check valve means, in-die fluid path, and fifth thermal medium path pipe connected together.

The heating/cooling unit according to the present invention provides in the mode of die set heating a thermal medium circulating circuit with the second pump means, heating means, first check valve means, in-die fluid path of the die set, and fifth thermal medium path pipe coupled together. It is therefore, not only feasible that in the heating mode, the thermal medium flowing out with a relatively high temperature from the in-die fluid path of the die set is effectively heated by delivering the thermal medium directly through the heating means but not via the cooling means, but also practicable to quickly heat the die set with high efficiency as compared with the conventionality wherein the thermal medium goes through heating while kept circulating through the heating means by way of the cooling means.

Further with the heating/cooling unit of the present invention, starting the cooling mode concurs with flowing back those portions of the thermal medium respectively in the in-die fluid path of the die set and its adjacency directly to the cooling means, with the thermal medium in kept the circulating circuit since the heating mode remaining therein. As a consequence, the thermal medium brought back to the cooling means can be cooled with high efficiency, and it can thus be quickly cooled sufficiently, whereby the cooling means is allowed to come in a reduced capacity design.

It is further noted that when the flow direction changeover valve means is held at the neutral position, namely, in the standby mode, the thermal medium discharged from the first pump means is brought back to the thermal medium storage means, whereby it becomes unnecessary to circulate the thermal medium in a manner to return it to the thermal medium storage means via a relief circuit installed with a relief valve as with the conventionality.

This results in practicability to circulate the thermal medium with no time of wait until the in-pipe thermal medium pressure rises to a setpoint of the relief valve, whereby it becomes practicable to save the energy of electricity to energize a pump drive motor.

It is also noted that the heating/cooling unit according to the present invention is of such an arrangement wherein the second pump is means is installed between the heating means and the flow direction changeover valve means, whereby there is no chance for a shift from the heating process to the cooling process to encounter the trouble over a back flow of the thermal medium thus for heated high in the heating means to the cooling means via the flow direction changeover valve means, whereby it becomes feasible to improved the efficiency of cooling.

Further, the heating/cooling unit according to the present invention contrived to be of such an arrangement wherein a thermal medium is introduced into an in-die fluid path formed within a die set, whereby the die set may be selectively heated or cooled, otherwise comprises:

thermal medium storage means to contain a thermal medium therein;

first pump means to suck up and discharge the thermal medium from inside the thermal medium storage means;

first thermal medium path pipe to deliver the thermal medium discharged from the first pump means;

flow direction changeover valve means with first, second, third, and fourth ports, which in a standby mode preceding a die set heating mode, and wherein the first thermal medium path pipe is coupled to the first port, delivers to the second port the thermal medium discharged from the first pump means, with the first and second ports held in fluid communication with each other, in the heating mode, delivers to the third port the thermal medium discharged from the first pump means, with the first and third ports kept in fluid communication with each other, and in the cooling mode, delivers to the fourth port the thermal medium discharged from the first pump means, with the first and fourth ports maintained in fluid communication with each other;

first thermal medium return pipe connected to the second port of the flow direction changeover valve to flow back the thermal medium to the thermal medium storage means;

cooling means installed on the first thermal medium return pipe to cool the thermal medium prior to return to said thermal medium storage means;

second thermal medium path pipe coupled to the fourth port of the flow direction changeover valve means to deliver the thermal medium therefrom;

thermal medium pressurizing motor coupled to the third port of the flow direction changeover valve for fluid communication therewith via the second thermal medium path pipe, and which is driven by the pressure of the thermal medium inside the second thermal medium path pipe;

second pump means driven by the thermal medium pressurizing result;

third thermal medium path pipe to deliver the thermal medium from the in-die fluid path of the die set to the second pump means;

fourth thermal medium path pipe to deliver the thermal medium discharged from the thermal medium pressurizing motor to the cooling means;

fifth thermal medium path pipe to deliver the thermal medium from the second pump means into the in-die fluid path of the die set;

fifth check valve means installed on the fifth thermal medium path pipe to prevent from flowing back the thermal medium which is from the die set;

heating means installed on the fifth thermal medium path pipe extending between the first check valve means and the second pump means to heat the thermal medium;

sixth thermal path pipe to couple the third port of the flow direction changeover valve means to the in-die fluid path of the die set for fluid communication with each other;

second check valve means installed on the sixth thermal medium path pipe to prevent from flowing back the thermal medium which is from the die set;

second thermal medium return pipe coupled to the first thermal medium return pipe to deliver the thermal medium from inside the die set to the cooling means;

opening/closing switching valve means installed on the second thermal medium return pipe, and which in the heating mode, closes thereof to prevent the thermal medium from flowing back, and in the cooling mode, opens thereof to release a flow of the thermal medium; and control means to control in the die-set heating mode the flow direction changeover valve means, the second pump means, and the opening/closing switching valve means, in a manner to set up a thermal medium circulating circuit with the second pump means, heating means, first check valve means, in-die fluid path of the die set and the third thermal medium path pipe connected together.

The heating/cooling unit according to the present invention provides in the mode of die set heating a thermal medium circulating circuit with the second pump means, heating means, check valve means, and in-die fluid path of the die set coupled together. It is therefore not only feasible that in the heating mode, the thermal medium flowing out with a relatively high temperature from the in-die fluid path of the die set is effectively by delivering the thermal medium heated directly to the heating means but not via the cooling means, but also practicable to quickly heat the die set with high efficiency as compared with the conventionality wherein the thermal medium goes through heating while kept circulating through the heating means by way of the cooling means.

Further with the heating/cooling unit of the present invention, starting the cooling mode concurs with flowing back those portions of the thermal medium respectively in the in-die fluid path of the die set and its adjacency directly to the cooling means, with the thermal medium kept in the circulating circuit since the heating mode remaining therein. As a consequence, the thermal medium brought back to the cooling means can be cooled with high efficiency, and it can thus be quickly cooled sufficiently, whereby the cooling means is allowed to come in a reduced capacity design.

It is further noted that when the flow direction changeover valve means is held at the neutral position, the thermal medium discharged from the first pump means is brought back to the thermal medium return pipe side leading to the thermal medium storage means, whereby it becomes unnecessary to circulate the thermal medium in a manner to return it to the thermal medium storage means via a relief circuit installed with a relief valve as with the conventionality. This results in practicability to circulate the thermal medium with no time of wait until the in-pipe thermal medium pressure rises to a setpoint of the relief valve, whereby it becomes practicable to safe the energy of electricity to energize a pump drive motor.

It is also noted that the heating/cooling unit according to the present invention is of such an arrangement wherein the second pump means is installed between the heating means and the cooling means, whereby there is no chance for a shift from the heating process to the cooling process to encounter the trouble over a back flow the thermal medium thus far heated high in the heating means to the cooling means, whereby it becomes feasible to improve the efficiency of cooling Further, the heating/cooling unit according to the present invention contrived to be of such an arrangement wherein a thermal medium is introduced into an in-die fluid path formed within a die set, whereby the die set may be selectively heated or cooled, otherwise comprises:

thermal medium storage means to contain a thermal medium therein;

first pump means to suck up and discharge the thermal medium from inside the thermal medium storage means;

flow direction changeover valve means with first, second, third, and fourth ports, which in a standby mode preceding a die set heating mode, and wherein the first thermal medium path pipe is coupled to the first port, delivers to the second port the thermal medium discharged from the first pump means, with the first and second ports held in fluid communication with each other, in the heating mode, delivers to the third port the thermal medium discharged from the first pump means, with the first and third ports kept in fluid communication with each other, and in the cooling mode, delivers to the fourth port the thermal medium discharged from the first pump means, with the first and fourth ports maintained in fluid communication with each other;

first thermal medium return pipe connected to the second port of the flow direction changeover valve means to flow back the thermal medium to the thermal medium storage means;

cooling means installed on the first thermal medium return pipe to cool the thermal medium prior to return to said thermal medium storage means;

second thermal medium path pie coupled to the fourth port of the flow direction changeover valve to deliver the thermal medium therefrom;

thermal medium pressurizing motor coupled to the fourth port of the flow direction changeover valve mean for fluid communication therewith via the second thermal medium pat pie, and which is driven by the pressure of said thermal medium;

second pump means driven by the thermal medium pressurizing motor;

third thermal medium path pipe to deliver the thermal medium from the in-die fluid path of the die set to the second pump means fourth thermal medium path pipe to deliver the thermal medium transferred from the thermal medium pressurizing motor to the cooling means;

fifth thermal medium path pipe to deliver the thermal medium from the second pump means into the in-die fluid path of the die set;

first check valve means installed on the fifth thermal medium path pipe to prevent from back flowing the thermal medium which is from the die set;

heating means installed on the fifth thermal medium path pipe extending between the first check valve means and the second pump means;

sixth thermal medium path pipe to couple the third port of the flow direction changeover valve means and the in-die fluid path of the die set for fluid communication with each other;

second check valve means installed on the sixth thermal medium path pipe to prevent from flowing back the thermal medium which is from the die set;

second thermal medium return pipe coupled to the first thermal medium return pipe to deliver the thermal medium from the die set to the cooling means;

opening/closing switching valve means installed on the second thermal medium return pipe, and which in the heating mode, closes thereof to prevent the thermal medium from flowing back, and in the cooling mode, opens thereof to release a flow of the thermal medium;

control means to control in the die-set heating mode the flow direction changeover valve means, the second pump means, and opening/closing switching valve means in a manner to set up a thermal medium circulating circuit with the second pump means, heating means, first check valve means in-die fluid path of the die set and third thermal medium path pipe connected together;

second cooling means to cool the bearings rotatably supporting the drive shaft which couples the second pump means and the thermal medium pressurizing motor;

third pump means to suck up and discharge the thermal medium from inside the thermal medium storage means;

seventh thermal medium path pipe to deliver the thermal medium for use in bearing cooling to the second cooling means with the third pump means and the second cooling means coupled together for fluid communication with each other; and third thermal medium return pipe to return the thermal medium from the second cooling means to the first cooling means.

The heating/cooling unit according to the present invention provides in the heating mode a thermal medium circulating circuit with the second pump means, heating means, check valve means, and in-die fluid path of the die set coupled together. It is therefore not only feasible that in the heating mode, the thermal medium flowing out with a relatively high temperature from the in-die fluid path of the die set is effectively heated by delivering the thermal medium directly to the heating means but not via the cooling means, but also practicable to quickly heat the die set with high efficiency as compared with the conventionality wherein the thermal medium goes through heating while kept circulating through the heating means by way of the cooling means.

Further with the heating/cooling unit of the present invention, starting the cooling mode concurs with flowing back those portions of the thermal medium respectively in the in-die fluid path of the die set and its adjacency directly to the cooling means, with the thermal medium kept in the circulating circuit since the heating mode remaining therein. As a consequence, the thermal medium brought back to the cooling means can be cooled with high efficiency, and it can thus be quickly cooled sufficiently, whereby the cooling means is allowed to come in a reduced capacity design.

It is further noted that when the flow direction changeover valve means is held at the neutral position, the thermal medium discharged from one pump mean is brought back to the thermal medium return pipe side leading to the thermal medium storage means, whereby it becomes unnecessary to circulate the thermal medium in a manner to return it to the thermal medium storage means via a relief circuit installed with a relief valve as with the conventionality. This results in practicability to circulate the thermal medium with no time of wait until the in-pipe thermal medium pressure rises to a setpoint of the relief valve, whereby it becomes practicable to save the energy of electricity to energize a pump drive motor.

It is also noted that the heating/cooling unit according to the present invention is of such an arrangement wherein the second pump means is installed between the heating means and the cooling means, whereby there is no chance for a shift from the heating process to the cooling process to encounter the trouble over a back flow of the thermal medium thus far heated high in the heating means to the cooling means, whereby it becomes feasible to improve the efficiency of cooling.

It is again noted that the bearings which rotatably support the drive shaft coupling the second pump means to the thermal medium pressurizing motor to drive said second pump means are provided with a second cooling means which supplies the thermal medium for exclusive use in bearing cooling, whereby it becomes practicable to prevent the bearings from undergoing heating, resulting in not only feasibility to maintain stabilized bearing serviceability over a long period of use but also improved maintainability.

BRIEF DESCRIPTION OF THE DRAWINGS

FIG. 3 is a block diagram showing a control system of the heating/cooling unit presented in FIG. 2;

FIG. 6 is a block diagram showing a thermal medium flow out at the time the cooling process of the heating/cooling unit presented in FIG. 1 is under way;

FIG. 8 is a block diagram showing a thermal medium flow out at the time the heating/cooling unit of FIG. 7 is standing by;

FIG. 13 is a block diagram showing a thermal medium flow out while the heating/cooling unit of FIG. 12 is standing by;

DETAILED DESCRIPTION OF THE PREFERRED EMBODIMENTS

The heating/cooling unit in one embodiment of the present invention is described hereunder with reference to FIGS. 2 through 6.

Figure 1:
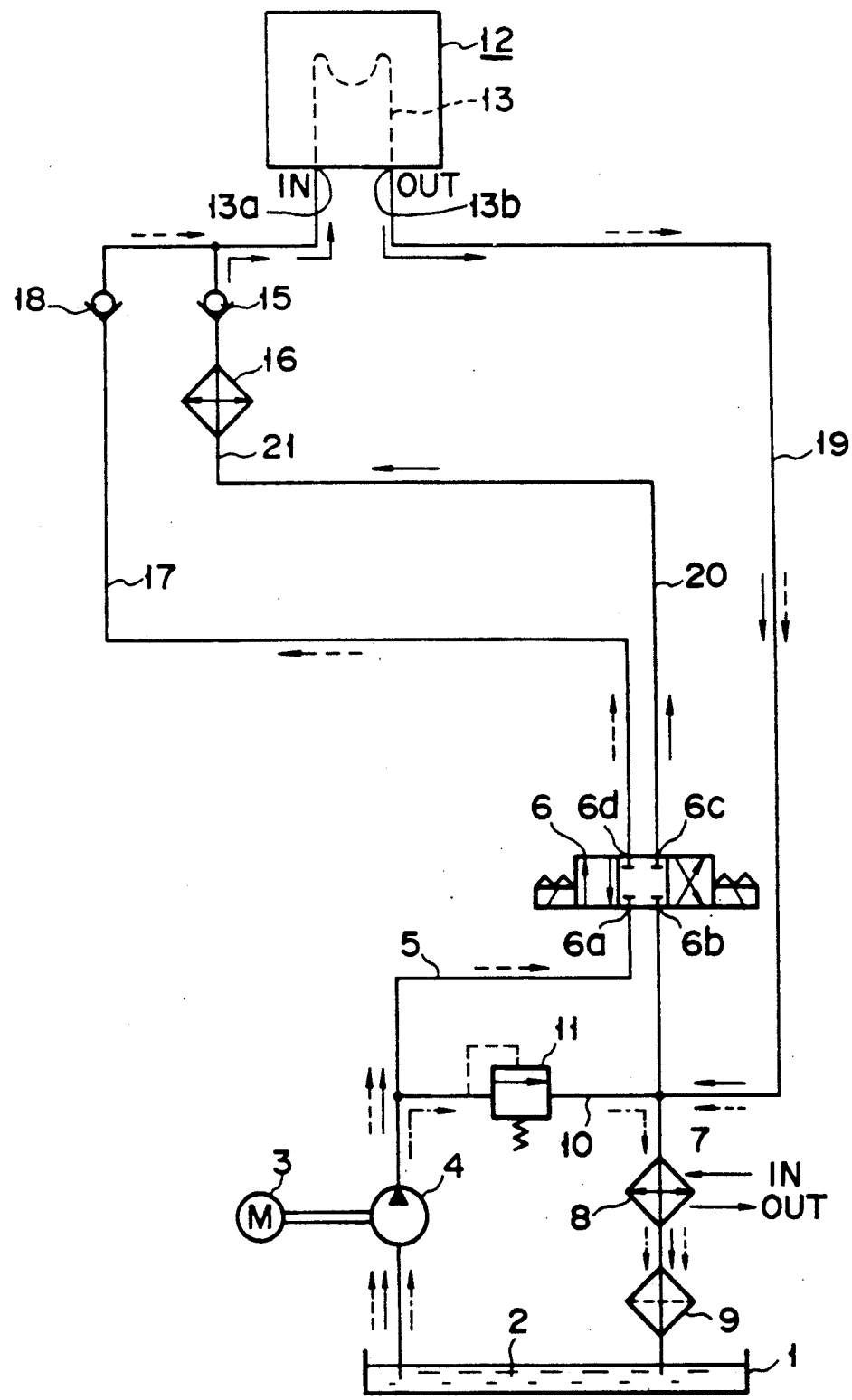
FIG. 1 is a block diagram showing a thermal medium circulating circuit of the conventional heating/cooling unit.
Figure 2:
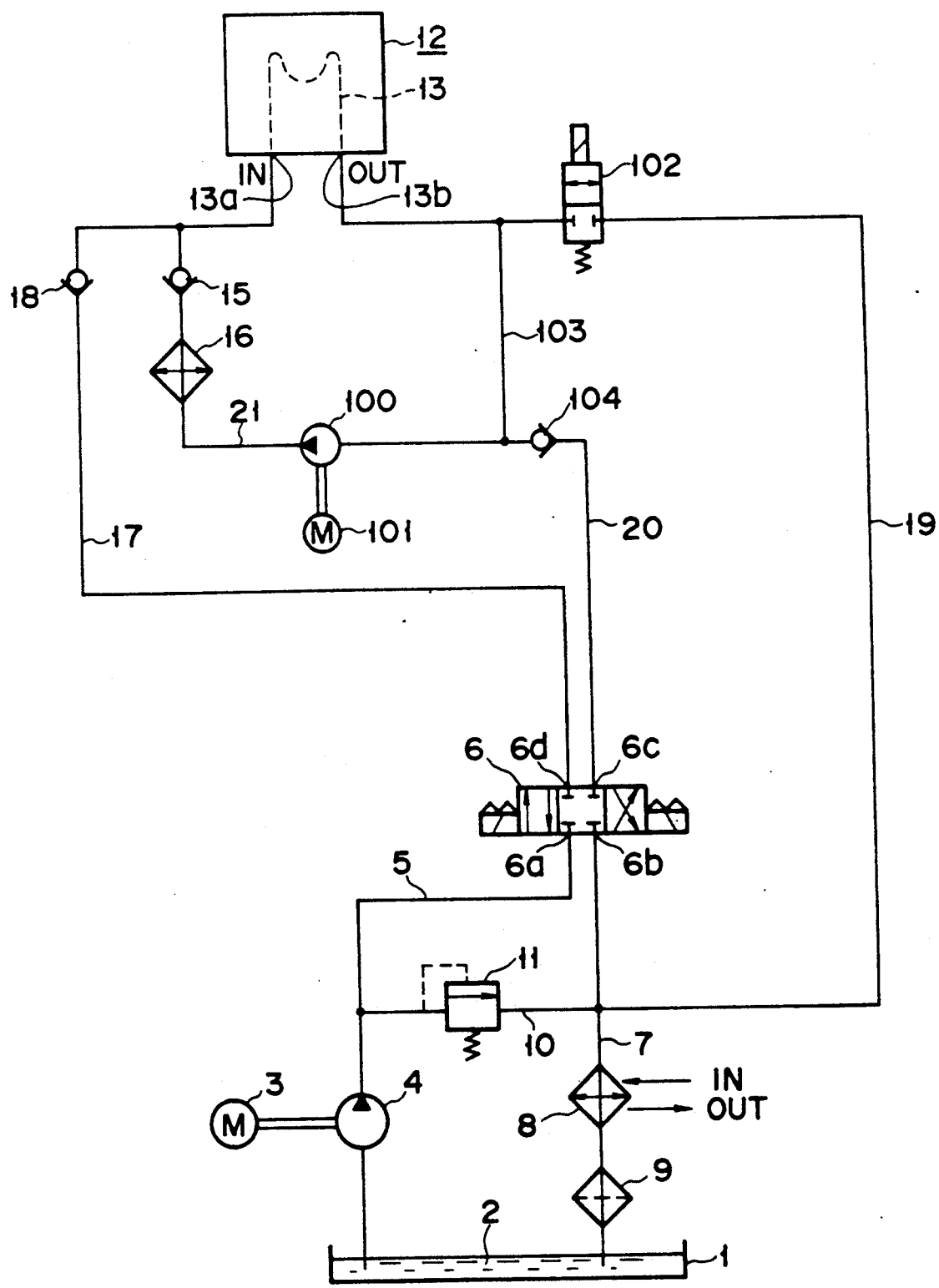
FIG. 2 is a block diagram showing a thermal medium circulating circuit of the heating/cooling unit in one embodiment of the present invention.

Presented in FIG. 2 is a thermal medium circulating circuit of the heating/cooling unit in on embodiment of the present invention. In the heating/cooling unit shown in FIG. 1, oil 2, a thermal medium is contained in a reservoir 1 from which the oil 2 is sucked up and discharged by a first oil pump 4 driven by an electric motor 3. The outlet of the oil pump 4 is coupled to a first port 6a of a flow direction changeover valve via a first oil path pipe 5. With the flow direction changeover valve 6 kept at a neutral position, namely kept deenergized, the oil 2 from the oil pump 4 flows into a second port to a reservoir port 6b. In other words, keeping the flow direction changeover valve 6 at the neutral position coincides with fluid communication maintained between the first port 6a and the second port 6b.

The second port 6b of the flow direction changeover valve 6 is connected to a first oil return pipe 7 to return the oil 2 into reservoir 1. The first oil return pipe is installed with a heat exchanger or an oil cooler 8 to cool the oil 2 prior to return to the reservoir 1, and an oil filter 9 as well. For the heat exchanger 8, cooling water is applied as a heat exchanging medium, and said oil cooler is of such a type capable of cooling water temperature control.

A relief pipe 10 is provided as a relief circuit branching off a first oil path pipe 5 and which is coupled to the first oil return pipe 7 said relief pipe 10 is installed with a relief valve 11 for maximum fluid pressure control.

A third port 6c of the flow direction changeover valve 6 is connected to a second oil pup 100 via a second oil path pipe 20.

The second oil pump 100 is driven by an electric motor 101. The outlet of the second oil pump 100 is coupled to an inlet 13a via a third oil path 21 for fluid communication therewith, of in-die fluid path 13 which is formed inside in each of a die set 12.

A third oil path pipe 21 is mounted with a check valve 15 to prevent a flow of the oil 2 from the die set 12, and an oil heater 16 as well located between the first check valve 15 and the second oil pump 100 to heat the oil 2. For this heater 16, a high-frequency induction heater is used which can instantly heat the oil 2.

Further, a fourth oil path pipe 17 is provided to couple together a fourth port 6d of the flow direction changeover valve 6, and an inlet 13a of the in-die fluid path 13 for fluid communication with each other. The fourth oil path pipe 17 is connected to the third oil path pipe through a check valves. The fourth oil path pipe 21 is mounted with a second check valve 18 to prevent a flow of the oil 2 from the die set 12. An outlet 13b of the in-die fluid path 13 of the die set is coupled to the inlet of the oil cooler 8 via a second oil return pipe 19. The second oil return pipe 19 is coupled to the first oil return pipe 7. The second oil return pipe 19 is installed with an opening/closing switching valve 102 to open and close the pipe line to regulate the flow of the oil 2. Further, the outlet 13b of the in-die fluid path 13 of the die set is coupled to a suction port of the second oil pump 100 for fluid communication each other via a fifth oil path pipe 103. The fifth oil path pipe 103 is coupled, respectively, to the second oil return pipe 19 and the second oil path pipe 20. The second oil path pipe 20 is mounted with a third check valve 104 between the flow direction changeover valve 6 and the fifth oil path pipe 103 to prevent the oil 2 from flowing to the flow direction changeover valve 6.

Further, as shown in FIG. 3, the electric motor 3 to drive the first oil pump 4, an electric motor 101 to drive both the flow direction changeover valve 6 and the second oil pump 100, and the opening/closing switching valve 102 are coupled to a control unit 106 which is to control an injection molding machine 105 so that these may be controlled by this control unit 106. Namely, in functional combination with these, heating and cooling the die set 12 are controlled, following the respective timings of plastic melt injection into the cavity of the die set 12 of the injection molding machine 105, as well as of opening of closing the die set 12 by a die opening/closing unit 107 in keeping pace with taking out each molded product. The cycle time of injection molding and the timings respectively of plastic melt injection and die set opening/closing are optionally selected according to product size, product structure, material used and other factors.

Figure 4:
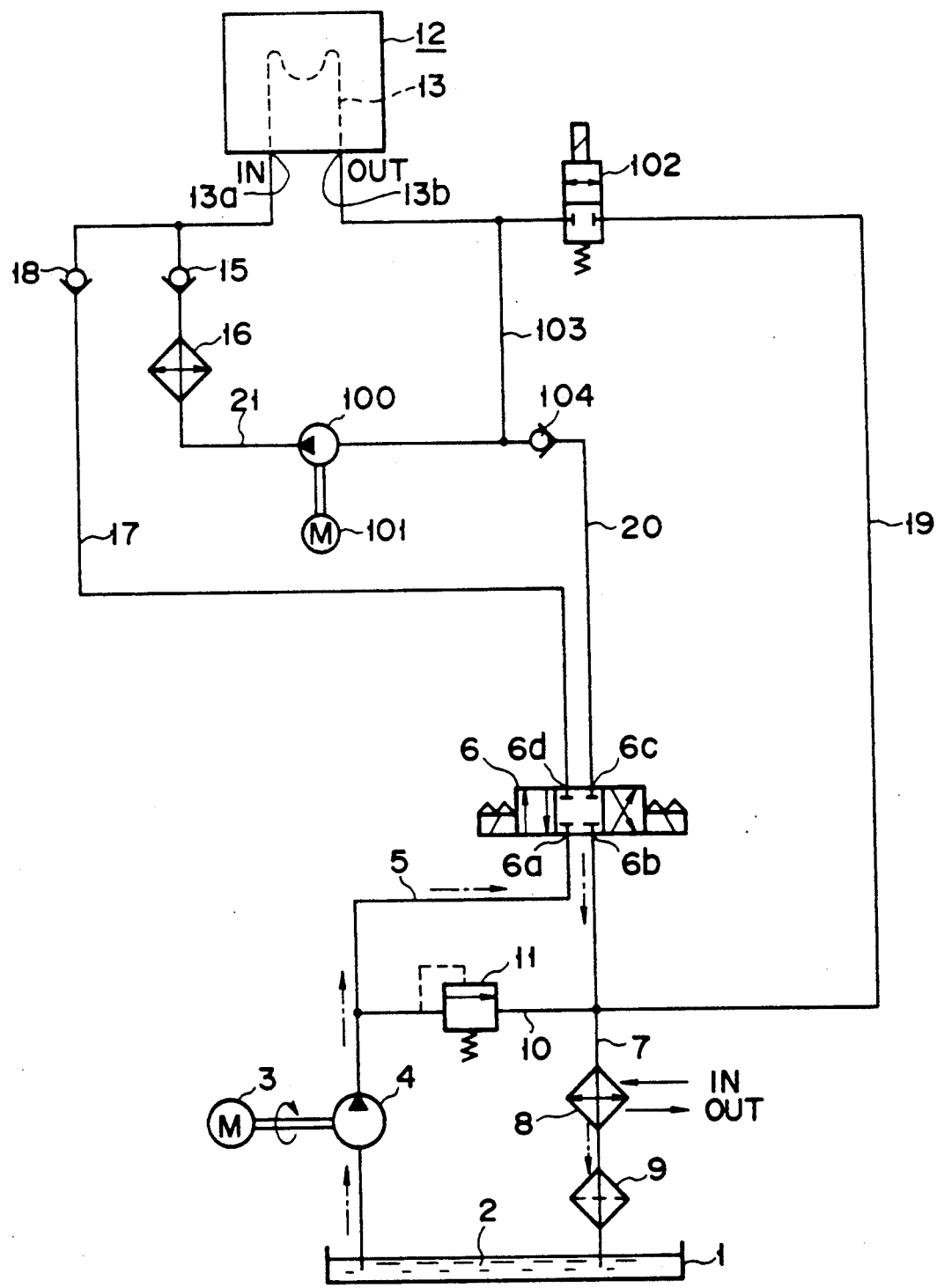
FIG. 4 is a block diagram showing how the thermal medium flows while the heating/cooling unit presented in FIG. 1 is running in the standby mode.

Next, the standby process of the heating/cooling unit of the present invention configured in such an arrangement as referred to above is described with reference to FIG. 4. The standby process concerned goes with the flow direction changeover valve 6 held at the neutral position, electric motor 101 to drive the second oil pup kept stationary, and opening/closing switching valve 102 maintained closed. As long as the standby process is progressing, the electric motor 3 to drive the first oil pump is running, whereby the first oil pump 4 is driven to suck up the oil 2 from inside the reservoir 1, and discharge it into the first oil path pipe 5. Since at this time, the flow direction changeover valve 6 is kept at the neutral position, with the first port 6a and the second port 6b left coupled together for fluid communication with each other, the oil 2 inside the first oil path pipe 5 flows into the first oil return pipe 7 installed with the oil cooler 8 and oil filter 9 via the flow direction changeover valve 6. Thus, the oil 2 is cooled by the oil cooler 8, and then runs through the oil filter 9 with impurities removed prior to return to the reservoir 1. The above statement is diagrammatically illustrated with the oil 2 circulating in the direction given by a single-dot line arrow in the figure, and getting cooled.

The standby process takes place with the oil pressure inside the first oil path pipe 1 maintained lower than the setpoint of a relief valve 11, whereby the oil inside the first oil path pipe flows into the reservoir 1 for circulation, resulting in lessening the load to the electric motor 3 as compared with the conventionality whereby it becomes practicable to save the energy of electricity to drive the electric motor 3.

Figure 5A:
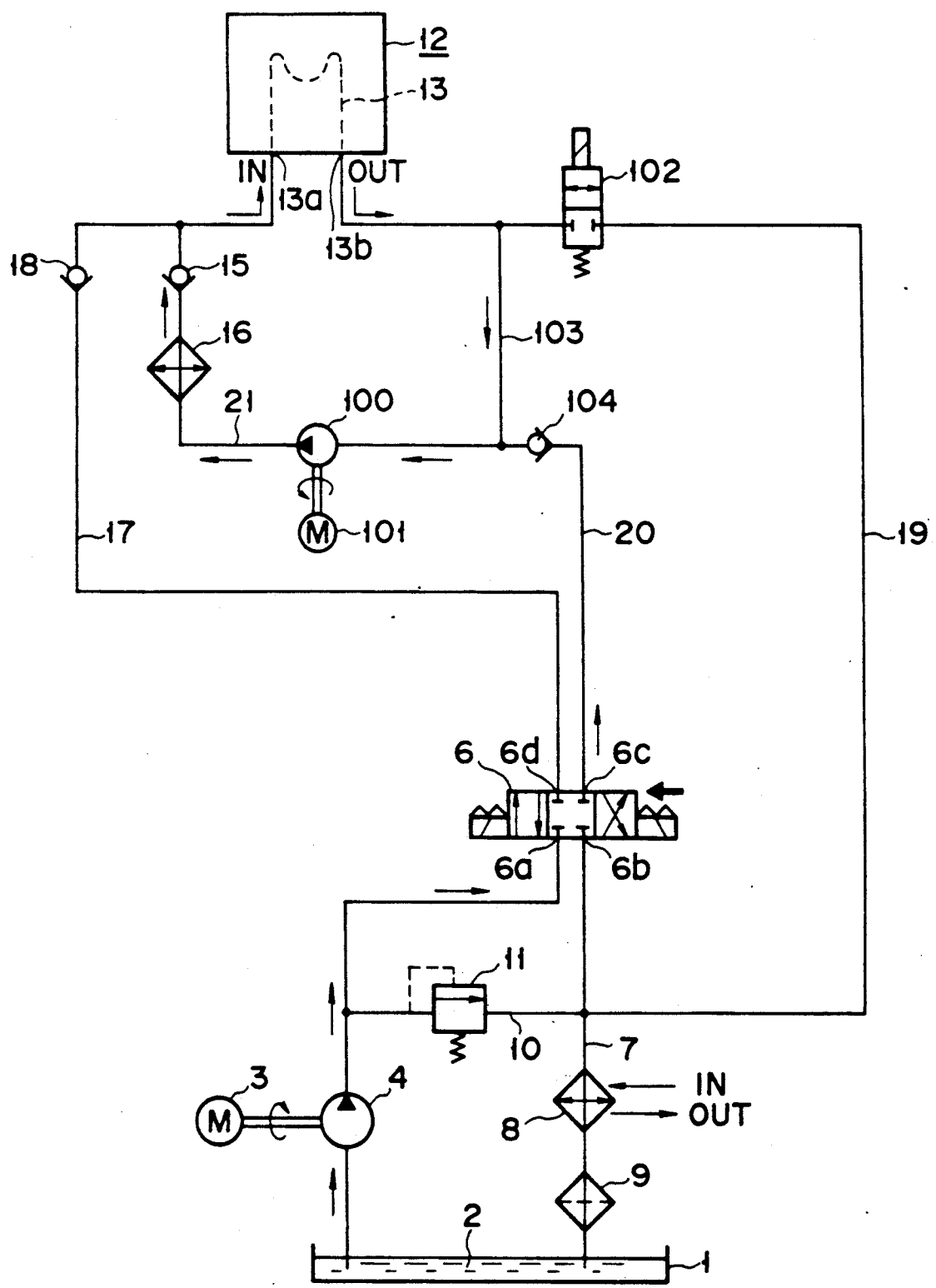
FIG. 5A is a block diagram showing how the thermal medium flows at the time heating is started for the heating process of the heating/cooling unit presented in FIG. 1.
Figure 5B:
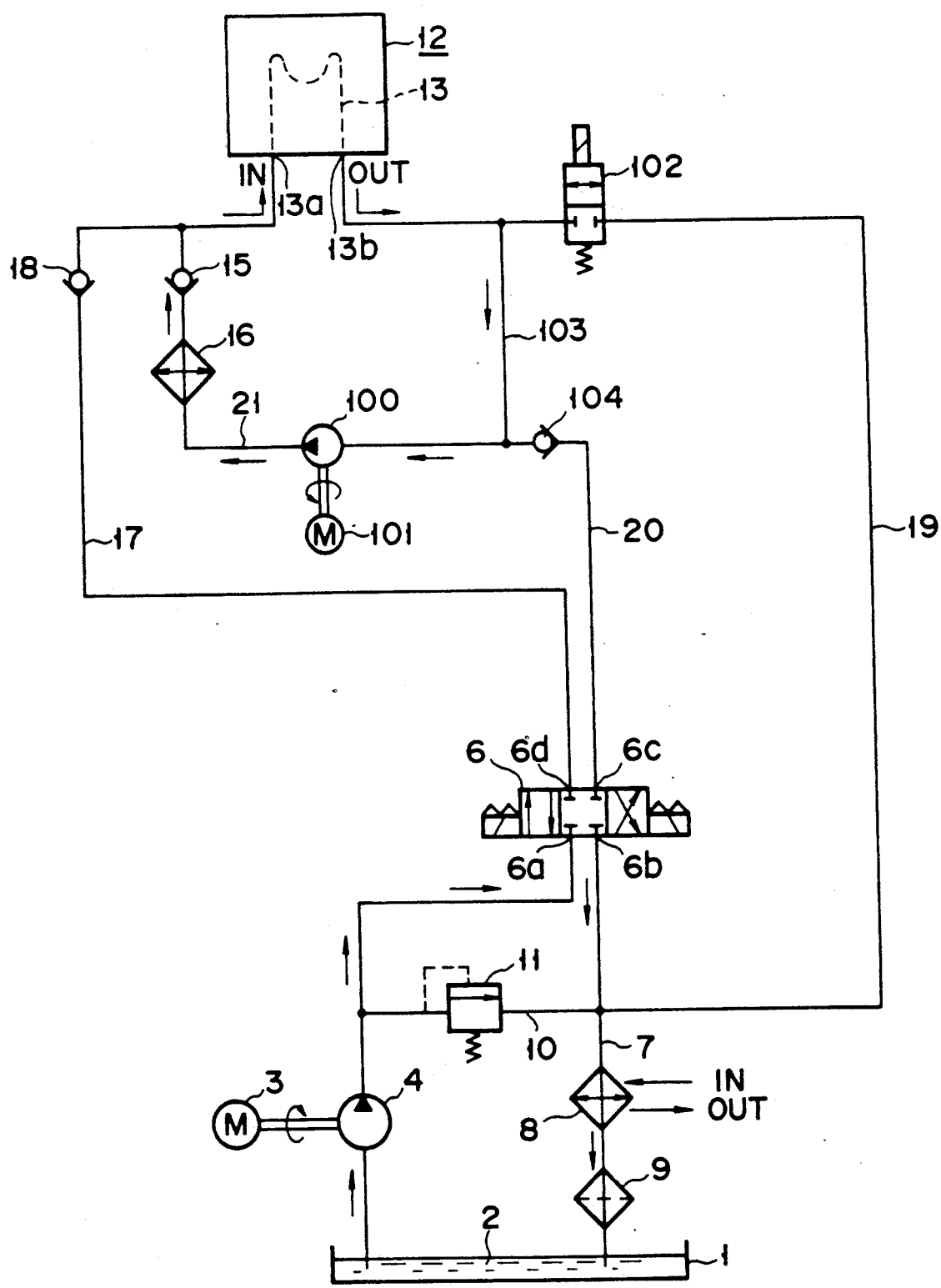
FIG. 5B is a block diagram showing how the thermal medium flows immediately after heating is started for the heating process of the heating/cooling unit presented in FIG. 1.

Now, with reference to FIGS. 5A and 5B, the process of heating the die set 12 which is applied for the heating/cooling unit of the present invention configured in such a arrangement as remarked above, is described hereunder.

The heating process starts firstly with the flow direction changeover valve 6 getting shifted to the position for right chamber energization as shown in FIG. 5A. Then, the oil 2 flows in the direction given by a solid line arrow. Namely, the cool oil 2 sucked up by the oil pump 4 from the reservoir 1 enters the first port 6a of the flow direction changeover valve 6 and delivered into the second oil path pipe 20 via the third port 6c, successively flowing through the check valve 104, from which the oil is then led to the second pump 100. At this time, the second oil pump 100 gets driven by the electric motor 101 which is almost simultaneously actuated with right chamber energization of the flow direction changeover valve 6, with the oil 2 getting further led into the third oil path pipe 21. Successively, the oil 2 experiences instantaneous heating by the oil heater 16, a high-frequency induction heater, and then, the heated oil 2 flows through the check valve 15, entering the in-die fluid path of the die set 12, and heating thereof.

Since the opening/closing switching valve 102 installed on the second oil return pipe 19 is closed at this time, the oil 2 flowing out with a relatively high temperature from the die set 12 does not flow through the second oil return pipe 19, instead passing through the fifth oil path pipe 103, and getting sucked up again by the second oil pump 100.

Several seconds' elapse after starting the heating process entails shifting the flow changeover valve 6 back to the neutral position as shown in FIG. 5B, whereby the second oil pump 100 is prohibited from being supplied with the oil 2. Namely, the oil 2 discharged from the first oil pump 3 thus starts circulating as specified by a solid arrow line to cool the oil staying in the reservoir 1.

Meanwhile, the oil 2 flowing out from the in-die fluid path 13 of the die set 12 circulates, flowing through the second oil pump 100, oil heater 16, and check valve 15, and again entering the in-die fluid path of the die set 12. Thus, the die set 12 is very quickly heated up to an optimal temperature, at which each molded product is assured freedom from undergoing the formation of welds.

As in the foregoing, the heating process in this embodiment of the present invention coexists with practicality of die set heating with the oil 2 flowing out with a relatively high temperature from the in-die fluid path of the die set 12 kept circulating subsequently, whereby a die set heating oil circulating circuit may be formed together with excellent efficiency of heating.

Next, the cooling process which the heating/cooling unit of the present invention provides for the die set 12, is described hereunder with reference to FIG. 6. Starting the cooling process is followed by shifting the flow direction changeover valve 5 to the position for left chamber energization, whereby the oil 2 flows in the direction given by an dot line arrow. Thus, the cool oil 2 which has been sucked up by the oil pump 4 from the reservoir 1 first enters the first port 6a of the flow direction changeover valve 6, flows into the fourth oil path pipe 17 via the fourth port 6d of said changeover valve, and then goes into the in-die fluid path 13 of the die set 12, thereby the die set 12 gets cooled. Meanwhile, with the signal transmitted at the timing to start the cooling process, the electric motor 101 stops, whereby the second oil pump 100 fails to suck up and discharge the oil 2.

Simultaneously with the transmission of said signal, the opening/closing switching valve 102 is energized, closing the second oil return pipe 19, with the result that the oil 2 flowing out from the in-die fluid path 13 of the die set 12 flows through the opening/closing switching valve 102, oil cooler 8, and oil filter 9, respectively, and returns into the reservoir 1, thereafter leaving therefrom for subsequent circulation to cool the die set 12.

A shift to the cooling process goes with flowing back the portions of the oil 2, respectively in the in-die fluid path 13 of the die set 12 and its neighborhood directly to the heat exchanger 8, with the other portion of the oil 2 within the circulating circuit for the heating process allowed to remain therein. This results in feasibility to not only quickly cool the oil 2 sufficiently with improved efficiency of cooling upon returning to the oil cooler 8 but also lessen the capacity of the heat exchanger 8.

Therefore in this cooling process, the die set 12 is quickly cooled down to a temperature permitting to take out the product molded in a cavity of the die set 12.

As the second oil pump 100 is installed between the oil heater 100 and the flow direction changeover valve 6, shifting the flow direction changeover valve 6 from one position for the heating process to another for the cooling process entails no trouble of flowing back the hot oil 2 in the oil heater 16 into the oil cooler 8 through the flow direction changeover valve 6. This results in practicability to raise the cooling efficiency of the heating/cooling unit. Further provision of a third check valve 104 effected in the second thermal medium path pipe 20 contribute lessen the volume of the hot oil 2 respectively in the oil path pipes 20 and 103 which flows back to the oil cooler via the flow direction changeover valve 6 at the time the flow direction changeover valve 6 is shifted from one position for the heating process to another for the heating process. This results in practicability to improve the cooling efficiency of the heating/cooling unit concerned.

Now with reference to FIGS. 7 through 11, another embodiment of the heating/cooling unit according to the present invention is described hereunder. With regard to the heating/cooling unit presented in FIGS. 7 through 11, those parts or portions of said until illustrated in FIGS. 2 through 6 are allocated respective identification codes, each with no presentation difference among their illustrations in these figures, with the description of said parts or portions omitted herein.

Figure 7:
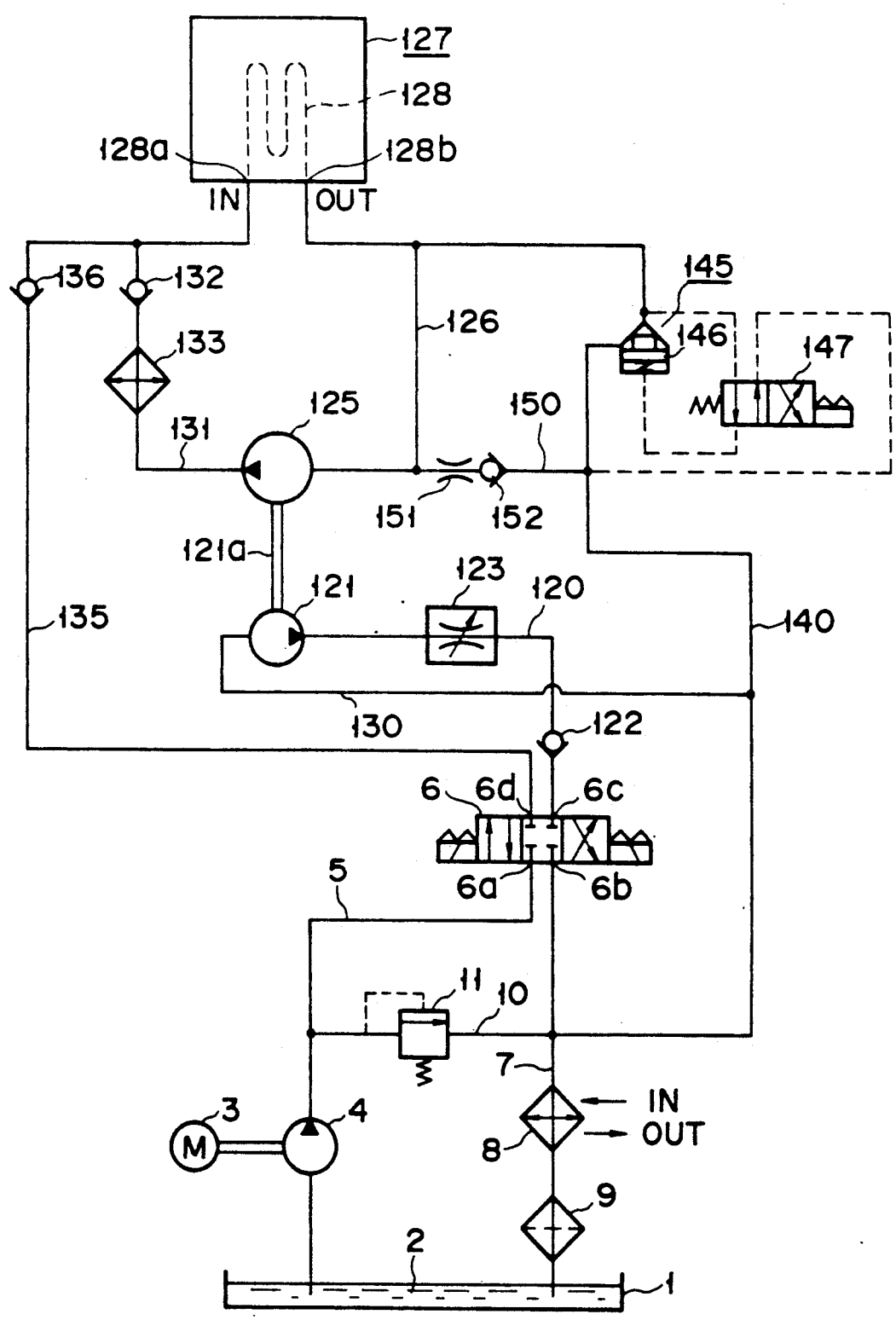
FIG. 7 is a block diagram presenting a thermal medium circulating circuit of the heating/cooling unit in another embodiment of the present invention.

In the heating/cooling unit in FIG. 7, the third port 6c of the flow direction changeover valve 6 is coupled to the inlet of an hydraulic motor 121 for generating a driving force via second oil path pipe 20, for fluid communication with each other. A first check valve 122 and a flow control valve 123 are provided midway in the second oil path pipe 120, whereby the hydraulic motor 121 is controlled to run at an optimal speed. The turning torque of the hydraulic motor 121 is transmitted to a second oil pump 125 through a drive shaft 121a. The inlet of the second oil pump 125 is coupled to an outlet 128b, for fluid communication therewith, of an in-die fluid path 128 of the die set 127. The discharge side of the hydraulic motor 121 is coupled to the inlet of the heat exchanger 8 by way of a fourth oil path pipe 130. The discharge side of the second oil path pipe 125, and an inlet 128a of the in-die fluid path 128 of the die set are coupled together for fluid communication with each other via a fifth oil path pipe 131.

The fifth oil path pipe is installed with a second check valve 132 to prevent a flow of the oil 2 from the die set 127, and further between the second check valve 132, and the second oil pump 125, there is provided an oil heater 133 to heat the oil 2. The oil heater 133 is a high-frequency induction heater capable of heating the oil 2 instantaneously.

A sixth oil path pipe 135 coupled together the fourth port 6d of the flow direction changeover valve 6, and the inlet 128a of the in-die fluid path 128 of the die set for fluid communication with each other; the sixth oil path pipe 135 is connected to the fifth oil path pipe 131. The sixth oil path pipe 135 is mounted with a third check valve 136 to prevent a flow of the oil 2 from the die set 127.

The outlet 128b of the in-die fluid path 128 of the die set is coupled to the inlet of the heat exchanger 8 via a second oil path pipe 140 which is connected to the first oil return pipe 7. The second oil return pipe 140 is installed with a opening/closing switching unit 145 for flow control of the oil 2; the opening/closing switching unit 145 comprises a logic valve 146 directly opening and closing an oil path, and a changeover valve 147 controlling the logic valve 146.

A seventh oil path pipe 150 is provided to couple together the third oil path pipe 126 on the suction side of the second oil pump 125, and the second oil return pipe 140 which is connected to the inlet of the heat exchanger 8, for fluid communication with each other. The seventh oil path pipe 150 has a throttle valve 151 installed on the side where the second oil pump 125 is located, and a check valve 152 mounted on the side the oil cooler 8 is situated.

Likewise with the control system presented in FIG. 3, the electric motor 3 for first oil pump drive, flow direction changeover valve 6 and changeover valve 147 are electrically coupled to control unit 106 which controls the injection molding machine 105. In line with opening and closing the die set 127 by the die opening/closing unit 107 which is actuated, following the respective timings of plastic melt injection into the cavity within the die set 127 set in place within the injection molding machine 105, as well as of molded product take-out, heating and cooling the die set 127 are controlled. The cycle time and the timings of plastic melt injection and molded product take-out are selected optimally according to size, and structure of the product concerned, material used, and other factors.

Now with reference to FIG. 8, the standby process of the heating/cooling unit of the present invention which is configured such as the above, is described hereunder. During the standby process, the flow direction changeover valve 6 is kept at the neutral position (where said changeover valve remains deenergized). Selecting the standby process coincides with starting the electric motor 3 for first oil pump drive, whereby the oil pump 4 is actuated, pumping up the oil 2 from inside the reservoir 1, which oil is subsequently discharged into the first oil path pipe 5. Since the flow direction changeover valve 6 is held at the neutral position at this time, with its first port 6a and second port 6b remaining coupled together for fluid communication with each other, the oil 2 in the first oil path pipe 5 flows through the flow changeover valve 6 and then enters the first oil return pipe 7 installed with the heat exchanger 8 and filter 9. Thus, the oil 2 is cooled by the heat exchanger 8, and subsequently cleaned by the oil filter with impurities removed, finally returning to the reservoir 1. Namely, the oil 2 is cooled while circulating in the direction given by a single-dot line arrow in the figure.

On this occasion, the oil in the first oil path pipe circulates with the pressure lower than the setpoint of the relief valve 11, thus resulting in enabling to lessen the load to the electric motor 3 as compared with the conventionality, whereby there is provided a chance to save the energy of electricity.

Figure 9A:
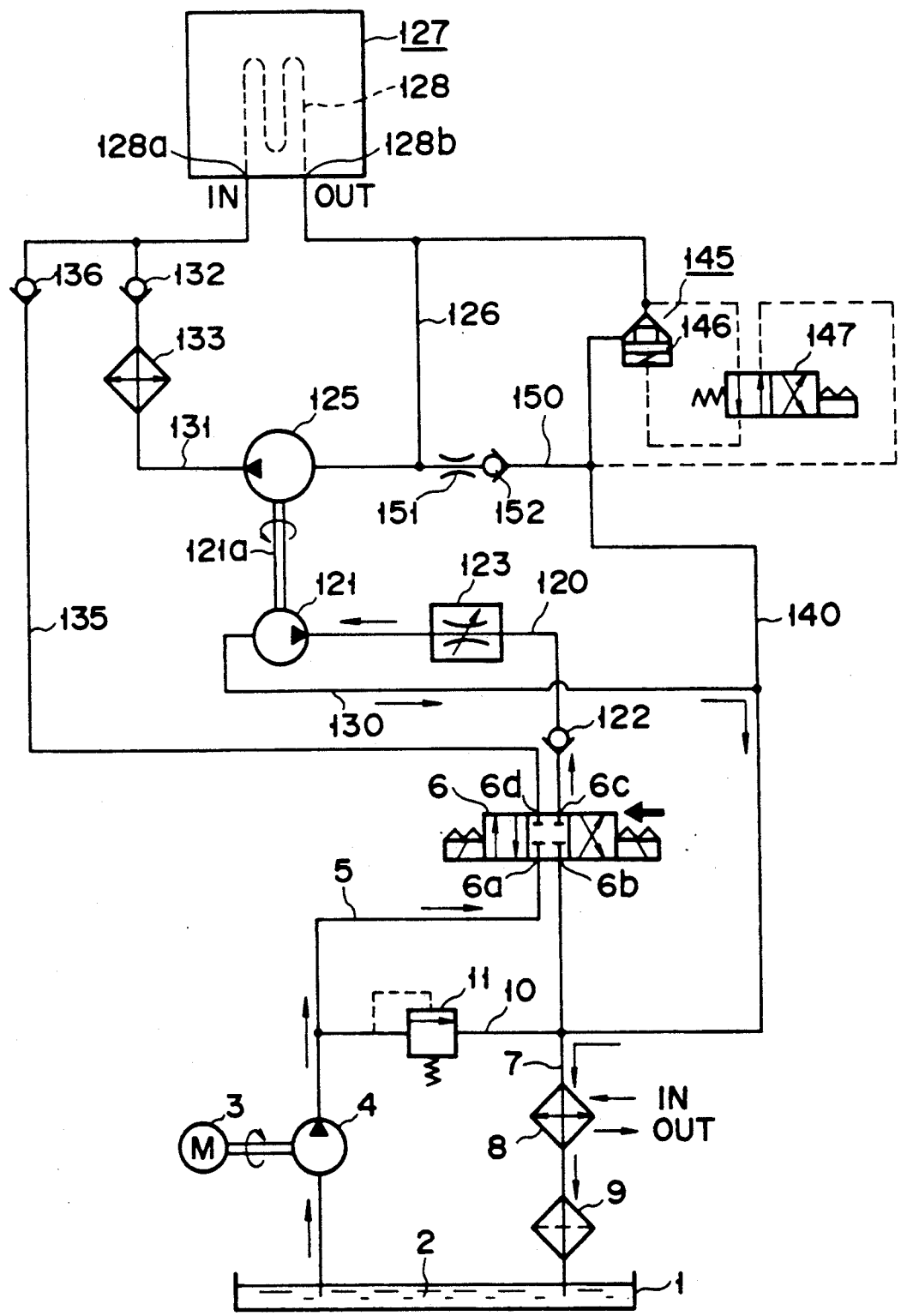
FIG. 9A is a block diagram showing a thermal medium flow out when heating is started for the heating process of the heating/cooling unit of FIG. 7.
Figure 9B:
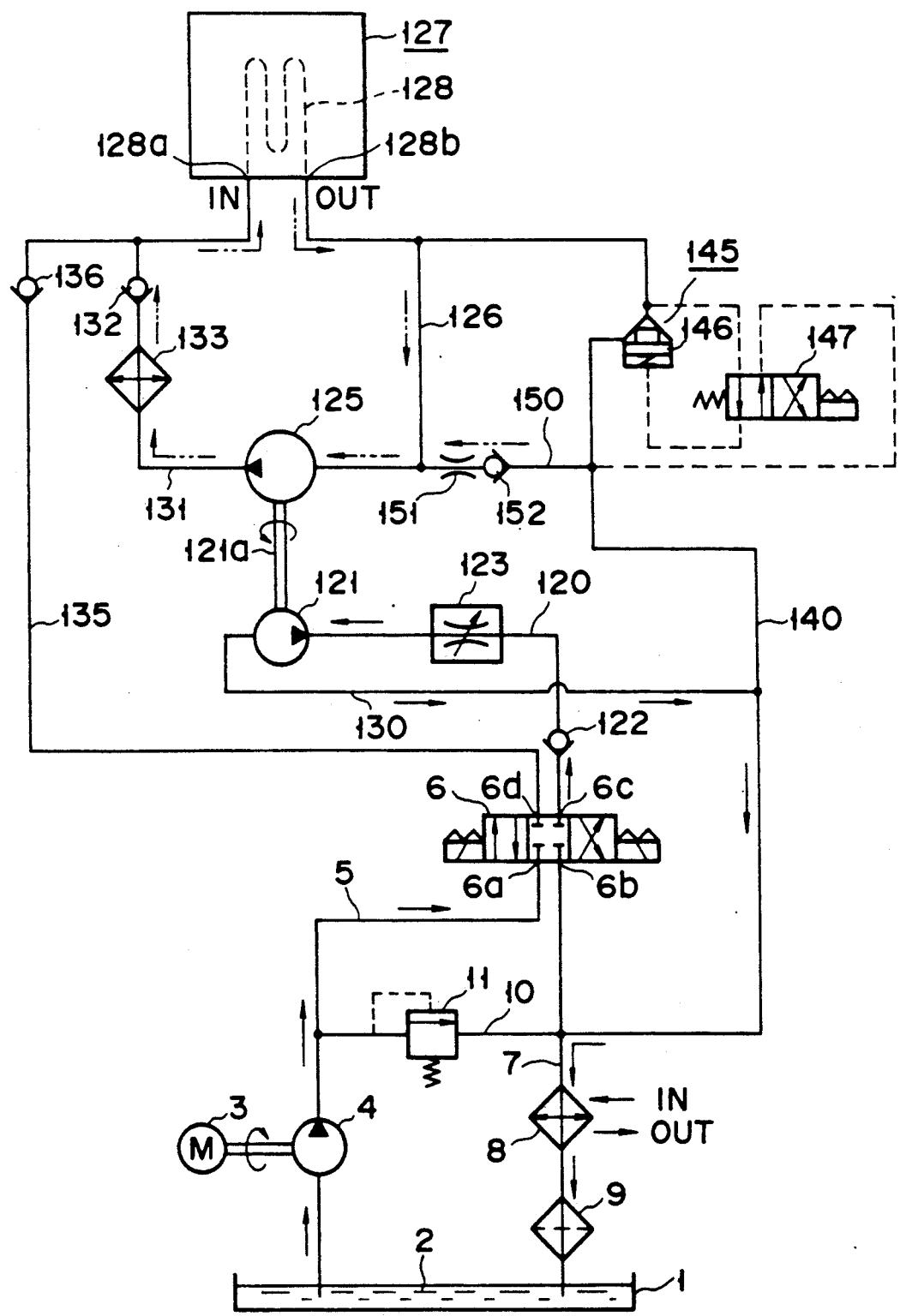
FIG. 9B is a block diagram showing how the thermal medium flows immediately after heating is started for the heating process of the heating/cooling unit presented in FIG. 7.

Next, referring to FIGS. 9A and 9B, how the heating process which the heating/cooling unit of the prevent invention provides for heating the die set 127, is configured is described hereunder.

Starting the heating process concurs with shifting the flow direction changeover valve 6 to another position for right chamber energization as shown in FIG. 9A, wherein the cool oil sucked up by the oil pump 4 from the reservoir 1 flows into the third port 6c of the flow direction changeover valve 6 via its first port 6a as shown by a solid line arrow, then gets discharged into the second oil path pipe 120, flows through the check valve 122 and the flow control valve 12, successively gets pressurized by the hydraulic motor, and is applied to the hydraulic motor 121 to drive thereof. The oil 2 passing through the hydraulic motor 121 with torations thereof produced further flows forth through the second oil return pipe 140 and the first o 1 return pipe 7 and is then delivered into the heat exchanger 8 where the oil is cooled and returned to the reservoir 1.

Driving the hydraulic motor 121 concurs with running the second oil pump 125, whereby the oil 2 flows in the direction given by a double-dot line arrow as shown in FIG. 9B. Namely, via the second oil return pipe 140, and the seventh oil path pipe 150 which is mounted with the check valve 152 and the throttle valve 151, the oil 2 is delivered into the second oil return pipe 126, via which the oil is then is charged into the fifth oil path pipe 131 installed with the oil heater 133.

Successively, the oil 2 is instantly heated through high-frequency induction heating by the oil heater 133, and flows forth through the check valve 132, subsequently entering the in-die fluid path 128 of the die set, transferring heat thereto.

As long as the heating process is under way, the changeover valve 147 of the opening/closing switching unit 145 remains deenergized, with the logic valve 146 maintained closed accordingly. This results in that the oil 2 flowing out with a relatively high temperature from the die set 127 does not flow through the second oil return pipe 140 but instead gets sucked up again by the second oil pump 125 via the third oil path pipe 126. Successively via the second oil pump 125, oil heater 133, and check valve 132, the oil circulates, again passing through the in-die fluid path 128 of the die set, whereby the die set 127 is very quickly heated up to an optimal temperature which assured each molded product freedom from incurring generation of welds.

This heating process configured such as the above allows effectively heating the oil 2 which flows out with a relatively high temperature from the in-die fluid path 128 of the die set, while circulating the oil 2, whereby this oil circulating circuit is ensured of greatly excellent thermal efficiency.

Since the discharge cycle of the second oil pump 125 coincide with continuous run of the hydraulic motor 121, the oil 2 discharged from the first oil pump 4 carries work-originated heat of the motor. However, the presence of a via-the-oil-cooler circulating circuit not only assures the oil a low temperature but also lessen oil temperature fluctuation, whereby the running speed of the hydraulic motor gets stabilized, with the delivery volume of the second oil pump 125 likewise stabilized.

Figure 10:
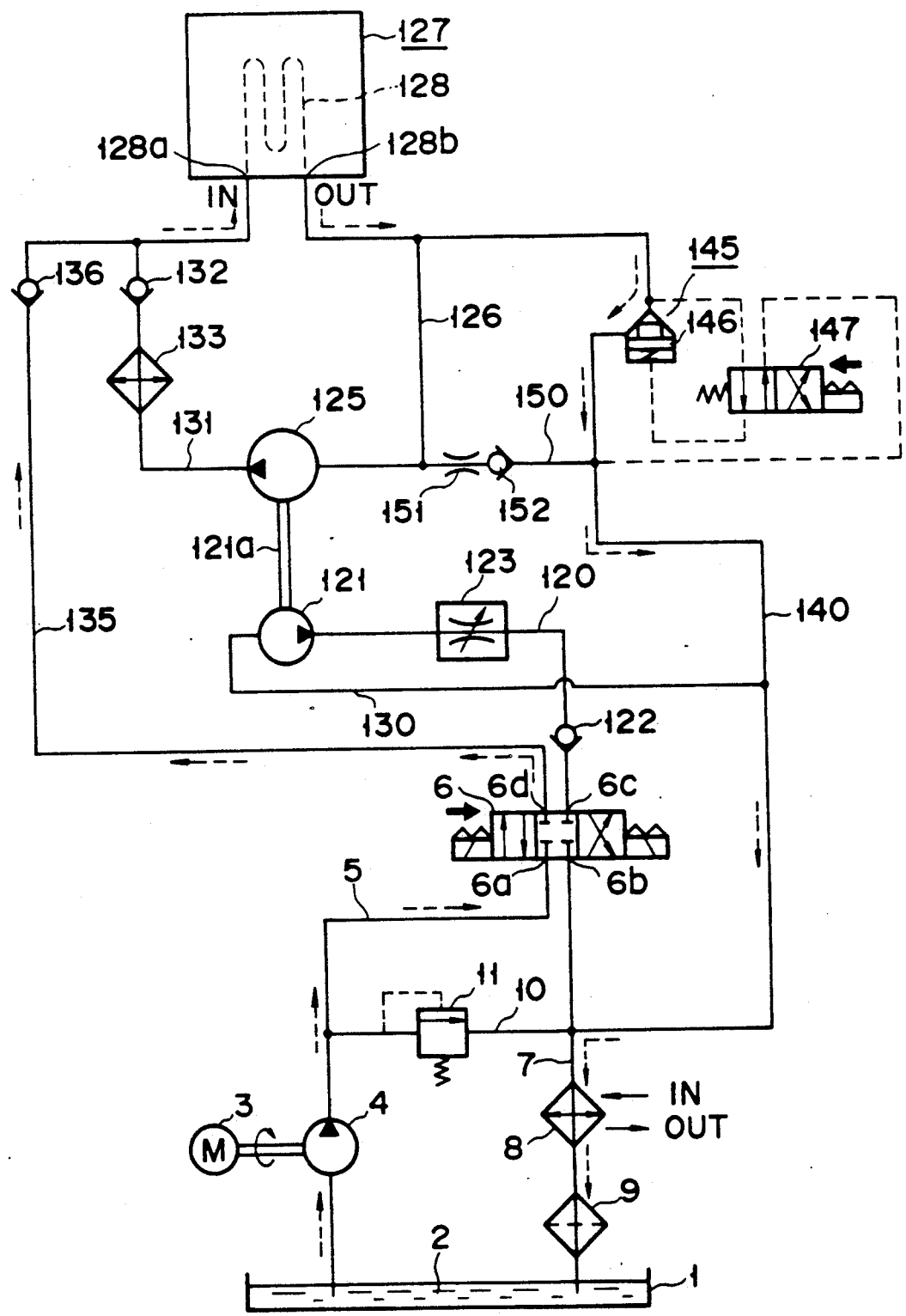
FIG. 10 is a block diagram showing a thermal medium flow out at the time the cooling process is in progress with the heating/cooling unit of FIG. 7.

Next, with reference to FIG. 10, how the cooling process which the heating/cooling unit of the present invention provides to cool the die set 127, is configured is described hereunder.

Starting the cooling process takes place with firstly shifting the flow direction changeover valve to another position for left chamber energization. This results in that the cool oil 2 sucked up by the oil pump 4 from the reservoir 1 flows into the first port 6a of the flow direction changeover valve 6, runs through its fourth port 6d and the sixth oil path pipe 135, getting discharged therefrom, and then enters the in-die fluid path 128 of the die set through the check valve 136, as specified by a broken line arrow, thus cooling the die set 127. At this time, the oil 2 to drive the hydraulic motor 121 does not flow, whereby the second oil pump 125 remains stationary, with no oil getting sucked up or discharged accordingly.

Meanwhile with the signal on which is to instruct starting the cooling process, the changeover valve 147 is energized, and the logic valve 146 opens, whereby the in-die fluid path 128 of the die set is coupled to the second oil return pipe 140 for fluid communication therewith. As a result, the oil 2 discharged from the in-die fluid path 128 of the die set goes through the logic valve 146, and further via the oil cooler 8 and oil filter 9, gets back into the reservoir 1, with the die set 127 subsequently having the cool oil 2 circulated there through for die cooling.

Though shifting to the cooling process entails flowing back the portions of the oil 2 respectively in the in-die fluid path of the die set and its vicinity directly into the heat exchanger 8, the oil 2 staying in a circulating circuit made available for die heating remains therein. Therefore, the oil cooler or heat exchanger 8 can exhibit excellent cooling efficiency with the oil 2 sent back thereto. In other words, quick and sufficient cooling is feasible with the oil 2 flowed back to the heat exchanger 8. This results in practicality to configure the oil cooler with a reduced capacity. Thus, in the cooling process configured in such an arrangement as the above, the heat exchanger 8 is allowed to undertake quickly cooling the die set 127 down to a temperature permitting to take out each molded product from the cavity within the die set, following the injection of plastic melt into said cavity.

It is further noted that between the oil heater 133 and the heat exchanger 8, there is situated the second oil pump 125, whereby a shift from the heating process to the cooling process does not come across the trouble of flowing back the hot oil 2 thus far in the oil heater 133 to the heat exchanger 8. This results in practicality to improve the efficiency of die cooling.

Figure 11:
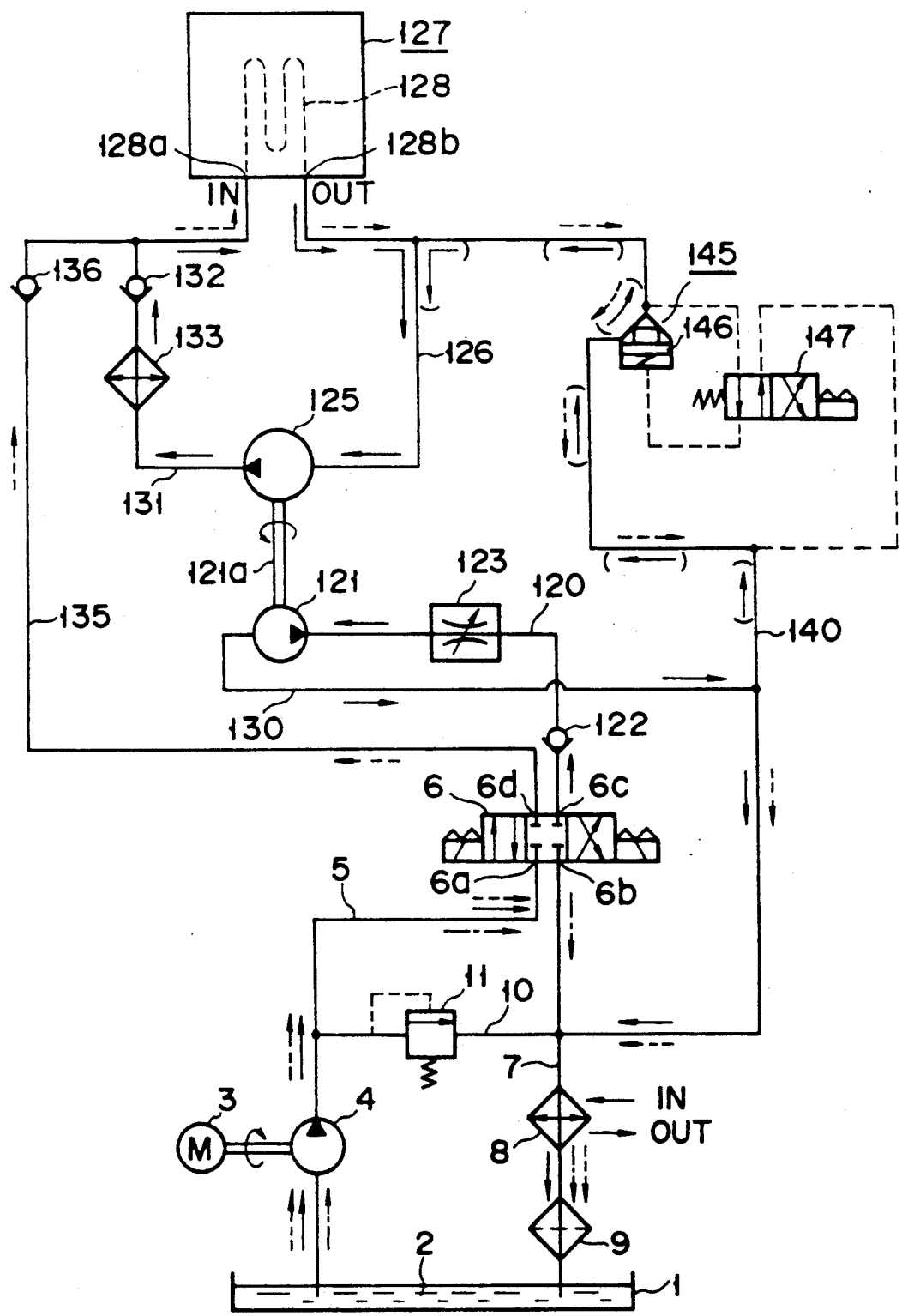
FIG. 11 is a block diagram showing a thermal medium circulating circuit in another modification of the heating/cooling unit in FIG. 7.

The embodiment of the present invention referred to above can be modified as shown in FIG. 11. As best illustrated in FIG. 11, the seventh oil path pipe 150 coupling together the third oil path pipe 126 on the suction side of the second oil pump 126, and the second oil return pipe 140 for fluid communication with each other may be omitted. In FIG. 1, the single-dot line arrow gives the route of circulating the oil 2 at the time the standby process is progressing, the solid line arrow shows another route of circulating the oil 2 made available for the heating process, and the broken line arrow indicates second another route of circulating the oil 2 prepared for the cooling process.

The heating/cooling unit illustrated in FIG. 11 is devoid of the seventh oil path pipe 150, thus requiring to deliver the oil 2 to the second oil pump 125 via the logic valve 146 at the time the heating process is under way. To meet this requirement, the changeover valve 147 is energized simultaneously with starting the hydraulic motor 121 thereby to open the logic valve so that the oil 2 may be sucked up in the direction given by the arrow enclosed in the parentheses. Locking the logic valve 146 several seconds thereafter enables to circulate the oil 2 repeatedly through the second oil pump 125, oil heater 133, check valve 132, and in-die fluid path 128 of the die set.

In illustrating FIG. 11 remarked above, those portions identical with the corresponding parts of the embodiment of the present invention referred to in the foregoing are given the same identification codes as those of said corresponding parts, with their structural descriptions omitted herein for the sake of convenience.

Further with reference to FIGS. 12 through 15, further another embodiment of the heating/cooling unit according to the present invention is described hereunder. With regard to the heating/cooling units illustrated respectively in FIGS. 12 through 15, the same areas or the same parts of the respective heating/cooling units presented in FIGS. 2 through 11 are assigned the same identification codes, with their description omitted for convenience sake.

Figure 12:
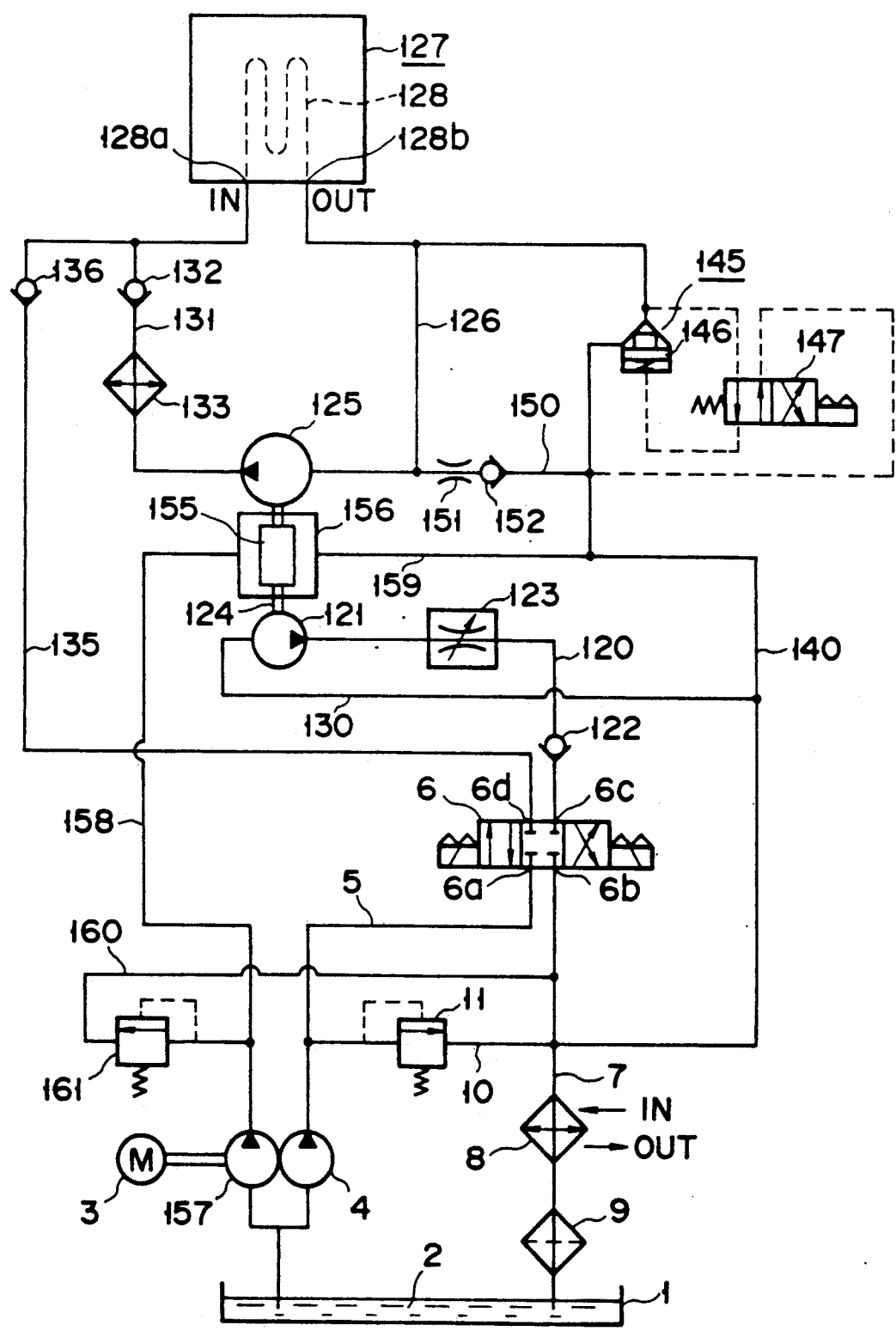
FIG. 12 is a block diagram showing a thermal medium circulating circuit of the heating/cooling unit in another embodiment of the present invention.

In the heating/cooling unit of FIG. 12, the bearings 155 rotatably supporting the drive shaft which couples together the second oil pump 125 and the hydraulic motor 121 to drive thereof is of such a structure force-cooled by the oil 2. More precisely with this structure, the bearings 155 is installed with a heat exchanger 156 applied a second oil cooler. Meanwhile, a third oil pump 157 is installed parallely to the first oil pump 4 so that they are driven commonly by the electric motor 3, wherein the third oil pump 157 sucks up and discharge the oil 2 from the reservoir 1. The discharge port of the third oil pump 157 is coupled to the inlet of the heat exchanger 156 via an oil path pipe 158 for fluid communication with each other. The outlet of the heat exchanger 156 is coupled to the inlet of the oil cooler 8 via an oil return pipe 159 for fluid communication with each other. The oil return pipe 159 is coupled to the second oil return pipe 140. A relief pipe 160 is provided as a relief circuit branching off from the oil path pipe 158 and which is coupled to the first oil return pipe 7; the relief pipe 160 is installed with a relief valve 161 to regulate the maximum in-pipe fluid pressure.

Similarly in the block diagram of FIG. 3, the first electric motor 3 for pump drive, flow direction changeover valve 6 and changeover valve 147 are electrically connected to the control unit 106 which controls the injection molding machine 105. Heating and cooling control of the die set 127 is implemented in response to the respective cycles of opening and closing the die set 127 by the die opening/closing unit 107 which runs, following the timings of plastic melt injection into the cavity within the die set 127 set in place of the injection molding machine 105, and molded product take-out. The cycle time and the timings of plastic melt injection and molded product take out are optimally selected according to size, and structure, of the product concerned, and material used, and other factors.

Figure 13:
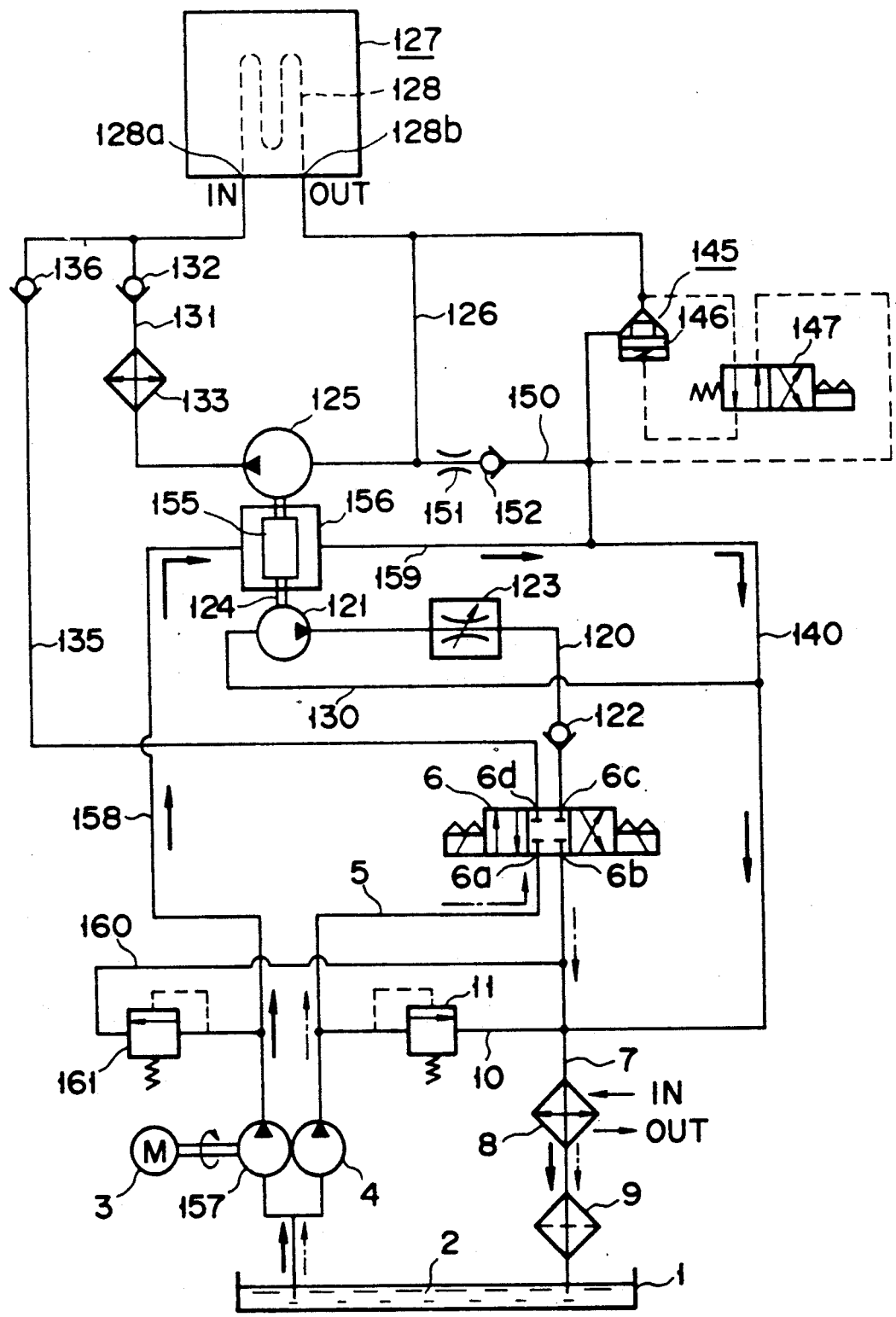

Next, referring to FIG. 13, the standby process which the heating/cooling unit of the present invention configured such as the above is described hereunder. As long as the standby process goes on, the flow direction changeover valve 6 is maintained at the neutral position (remaining deenergized) Starting the standby process coincides with running the electric motor 3, whereby the oil pump 4 is actuated, pumping up the oil 2 from the reservoir 1, and discharging it into the oil path pipe 5. Since the flow direction changeover valve is held at the neutral position at this time, with its first port 6a and second port 6b remaining coupled together for fluid communication with each other, the oil 2 within the first oil path pipe 5 flows through the flow direction changeover valve 6 and into the first oil return pipe 7 installed with the heat exchanger and oil filter 9. Thus, the oil 2 is cooled in the heat exchanger 8 from which the oil 2 is delivered into the oil filter 9 wherein it is cleared of impurities, with return to the reservoir 1 to ensue. Namely, the oil 2 circulates in the direction given by a single-dot line arrow in the figure and rendered cooling.

In this standby process, the oil 2 in the first oil path pipe 5 circulates with the pressure applied which is lower than a setpoint of the relief valve 11, flowing back into the reservoir 1, whereby as compared with the conventionality, the load to the electric motor 3 is lesser, resulting in practicality to save the energy of electricity. Meanwhile, with the standby process in progress, the electric motor 3 is running, whereby the third oil pump 157 is actuated, circulating the oil 2 within the reservoir 1 in the direction given by a thick solid line arrow. Namely, after delivery to the heat exchanger 156 via the oil path pipe 159 upon being sucked up by the oil pump 157, the oil 2 returns to the inlet of the oil cooler 8 by way of the oil path pipe 159 and successively gets cooled.

Figure 14A:
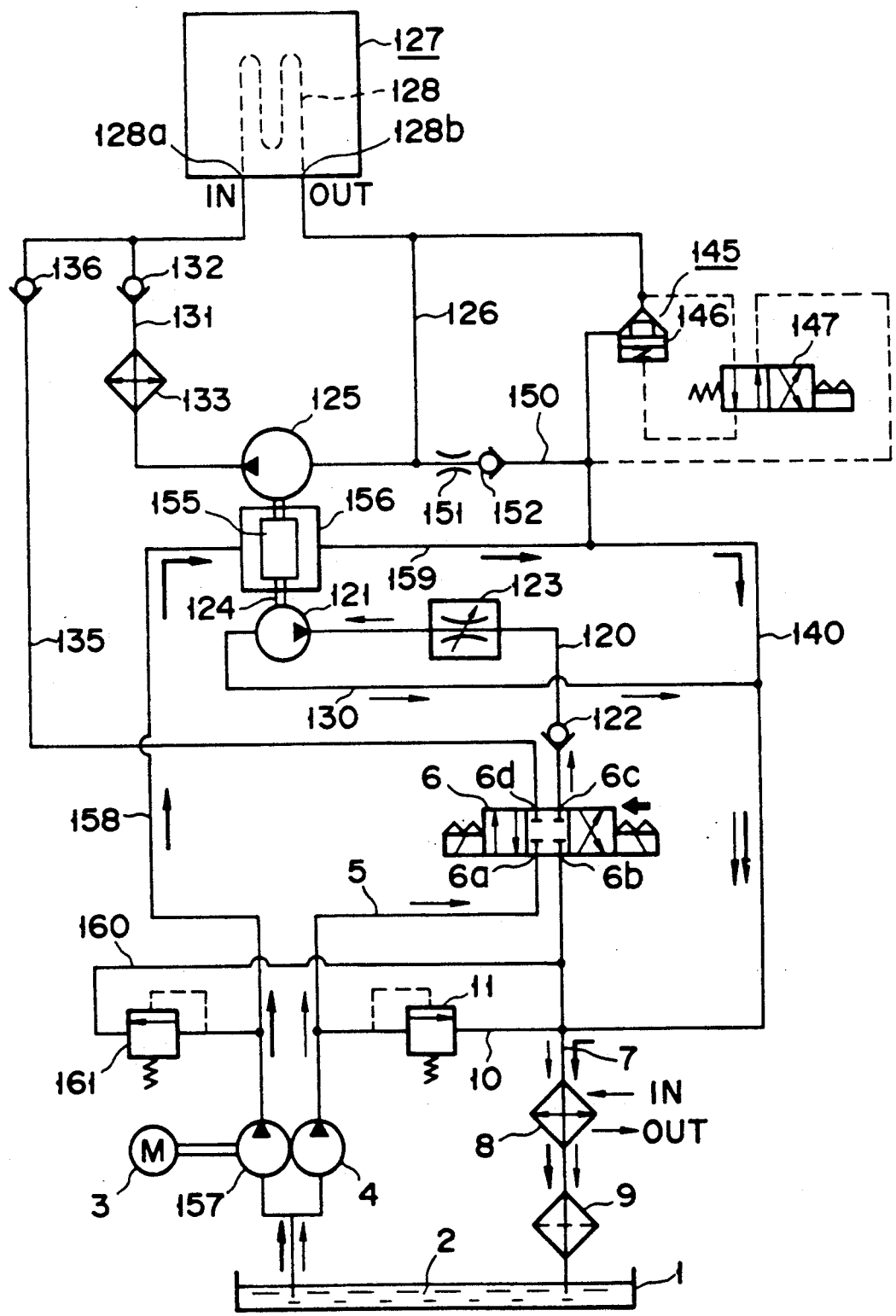
FIG. 14A is a block diagram showing how the thermal medium flows when heating is started for the heating process of the heating/cooling unit presented in FIG. 12.
Figure 14B:
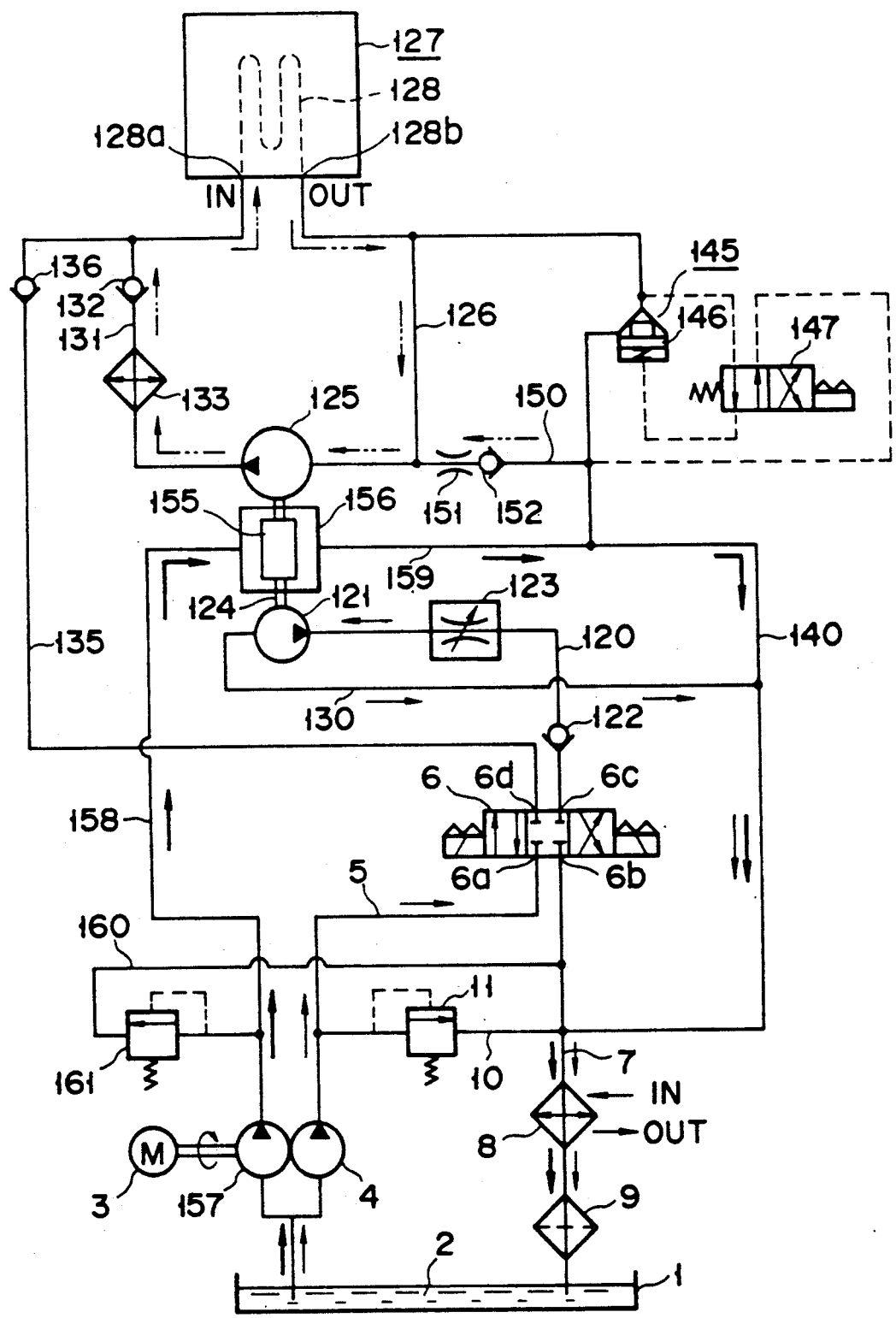
FIG. 14B is a block diagram showing how the thermal medium flows immediately after heating is started for the heating process of the heating/cooling unit in FIG. 12.

Next, with reference to FIGS. 14A and 14B, the heating process which the heating/cooling unit of the present invention configured such as the above for heating the die set 127, is described hereunder. Starting the heating process concurs with shifting the flow direction changeover valve 6 to another position for right chamber energization whereby the cool oil 2 sucked up by the oil pump 4 first flows into the first port 6a of the flow direction changeover valve 6, then gets discharged into the second oil path pipe 120 via the third port 6c as specified by a solid line arrow, subsequently flows through the check valve 122 and flow control valve 123, and reaches the hydraulic motor 121, driving thereof. The oil 2 passing through and simultaneously driving thereof flows forth, running through the second oil return pipe 140 and the first oil return pipe 7 sequentially, arriving at the heat exchanger 8 wherein it is cooled prior to return to the reservoir 1.

Meanwhile, driving the hydraulic motor 121 causes actuating the second oil pump. This results in that, as shown in FIG. 14B, the oil 2 flows through the second oil return pipe 140 and likewise runs through the seventh oil path pipe 150, as shown by a double-dot line arrow, which i installed with the check valve 152 and the throttle valve 151, subsequently getting delivered into the second oil return pipe 126, and next being discharged into the fifth oil path pipe 13 mounted with the oil heater 133. Thus, the oil 2 is instantly heated through high-frequency induction heating by the oil heater 133, and successively via the check valve 132, it flows into the in-die fluid path 128 of the die set, transferring heat thereto. At this stage in the heating process, the changeover valve 147 of the opening/closing unit 145 remains deenergized, whereby the logic valve is maintained closed. As a consequence, the oil 2 flowing out with a relatively high temperature from the in-die fluid path of the die set 127 does not flow toward the second oil return pipe 140 but instead gets sucked again into the second oil pump via the third oil path pipe 126 for circulation therethrough and via the oil heater 133, check valve, and in-die fluid path 128 of the die set. This results in enabling to very quickly heat the die set 127 up to a optimal temperature whereat molded products are not subject to generation of welds.

As is clear from the above, in the heating process, it is allowed that the oil 2 flowing out with a relatively high temperature from the in-side fluid path 128 of the die set is heated while keeping it circulated, whereby it becomes feasible to provide an oil circulation circuit with greatly excellent thermal efficiency.

Since the hydraulic motor is continuously running while the second oil pump is on, delivering the oil, the oil 2 out from the first oil pump carries hydraulic motor work-originated heat but the presence of an oil cooler 8-involved circulating circuit not only assures the oil 2 low temperatures but also lessen a temperature fluctuation and stabilizes the running speed of the hydraulic motor 121, whereby the delivery volume of the second oil pump 125 is stabilized.

In the meanwhile, running the electric motor 3 goes with driving the third oil pump 157, whereby the oil 2 inside the reservoir circulates as shown by a thick solid line arrow. Namely, after being delivered to the heat exchanger 156 via the oil path pipe 158 upon getting sucked up by the pup 157, the oil 2 flows through the oil return pipe 159, and back into the inlet of the heat exchanger 8, whereby the bearings 155 are cooled and thereby not subject to heating u to high temperature. This results in achieving long periodic and stabilized bearing functional serviceability and feasibility to improve bearing functional maintenability.

Figure 15:
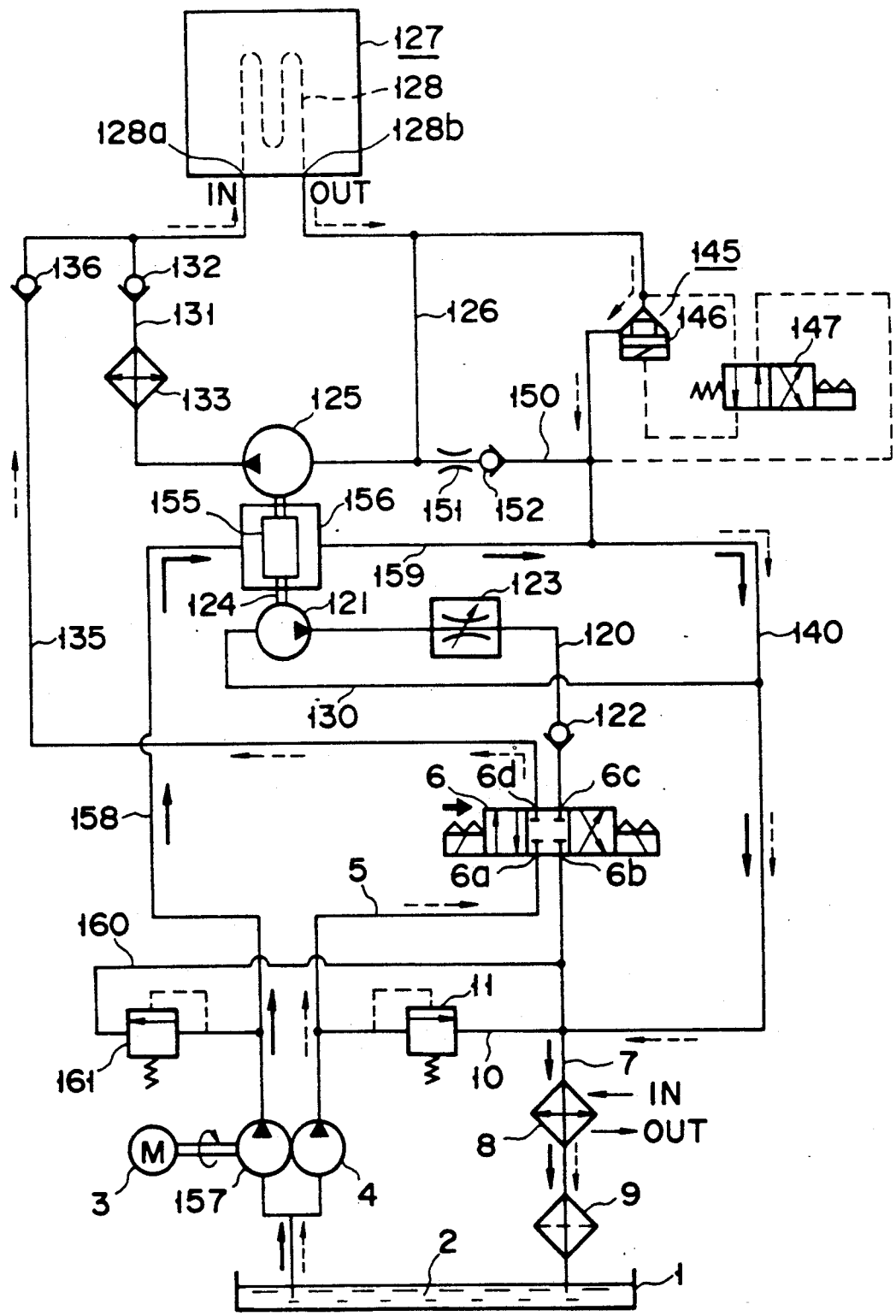
FIG. 15 is a block diagram showing a thermal medium flow out with the cooling process of the heating-/cooling unit presented in FIG. 12.

Now with reference to FIG. 15, the cooling process which the heating/cooling unit of the present invention configured such as the above provides for cooling the die set 127 is described hereunder. Starting the cooling process entails shifting the flow changeover valve 6 to another position for left chamber energization, whereby the cool oil 2 sucked up by the oil pump 4 from the reservoir 1 enters the first port 6a of the flow direction changeover valve 6, flows into the fourth port 6d and out from the sixth oil path pipe 135, and successively flows into the in-die fluid path 128 of the die set through the check valve 136, cooling the die set 127. At this stage in this process, the oil 2 to drive the hydraulic motor 121 remains stationary, thereby the second oil pump 125 is off with pumping up and discharging the oil.

Meanwhile with the signal on which is to instruct starting the cooling process, the changeover valve 147 is energized, and the logic valve 146 gets open, whereby the second oil return pipe 140 is coupled to the in-die fluid path 128 of the die set for fluid communication with each other. Thus, the oil 2 flowing out from the in-die fluid path 128 flows through the logic valve 146 and further through the oil cooler 8 as well as the oil filter 9, returning to the reservoir 1, with circulation of the cool oil to follow to cool the die set 127.

Though shifting to this cooling process coincides with flowing back those portions of the oil 2 respectively in the in-die fluid path 128 of the die set and its neighborhood into the oil cooler 8, the oil 2 kept in the heating cycle circulating circuit remains therein. This results in improved efficiency of cooling the oil returning to the heat exchanger 8, whereby it becomes feasible not only to quickly cool the oil sufficiently but also configure the oil cooler 8 with a decremented capacity. This enables to quickly cool the die set 127 down to a temperature permitting to take out each molded product, following the injection of plastic melt into the cavity within the die set 127.

Further, since the second oil pump 125 is installed between the oil heater 133 and oil cooler 8, changing over from the heating process to the cooling process is not confronted with the trouble of flowing back the hot oil 2 thus far staying in the oil heater 133 to the heat exchanger 8. This results in practicability to improve the efficiency of oil cooling.

Further, running the electric motor simultaneously actuates the third oil pump 157, whereby as shown by a thick solid line arrow, the oil 2 inside the reservoir 1 is first sucked up by the oil pump 157, successively delivered to the heat exchanger 156 via the oil path pipe 158, and then returns to the inlet of the oil cooler 8 through the oil return pipe 159 for cooling.

It must be noted that the present invention is not limited to the above-quoted embodiment but is available various modifications thereof within the spirit and the scope of the present invention.

For example, similarly to the heating/cooling unit illustrated in FIG. 11, the unit presented in FIG. 12 may be configured in such an arrangement devoid of the seventh oil path pipe 150 for use in coupling together the third oil path pipe 126 on the suction-side of the second oil pump 125, and the second oil return pipe 140 on the inlet side of the heat exchanger 8.

For the heating process, the above-quoted modification requires such an arrangement wherein the oil 2 is delivered to the second oil pump 125 via the logic valve 146, for there is not provided the seventh oil path pipe 150. It is therefore necessary that the changeover valve 147 be energized, and the logic valve 147 be opened simultaneously with starting the hydraulic motor 121, whereby the oil 2 may get sucked into the hydraulic motor. It is further required that several seconds thereafter, the logic valve 146 be locked again, whereby the oil 2 may repeatedly circulate through the second oil pump 125, oil heater 133, check valve 132, and in-die fluid path of the die set.

Though said modification is of such an arrangement wherein the first oil pump 4 and the third oil pump 157 are driven commonly by one electric motor 3, another arrangement is allowed wherein these oil pumps are driven by respective separate motors. It is further allowed that the bearing 155 are cooled with the third oil pump 157 on only during the heating process involving run of the hydraulic motor 121.

It must be further noted that the present invention is neither limited to the above-cited modification of one referred to above out of varieties but is available in various other modified embodiments within the spirit and scope of the present invention.

As in the foregoing, the present invention enables to heat the oil, a thermal medium flowing out with a relatively high temperature from an in-die oil circuit provided for a set of dies while keeping the oil circulating in a manner that the oil may be delivered directly to an oil heater but not via an oil cooler in the heating process.

Therefore, the heating/cooling unit according to the present invention is assured not only high heating efficiency but also the capability to quickly heat a die set in the heating process. It is further noted that, in the cooling process, the portions of the oil 2 through with heating and respectively in the in-die oil circuit of the die set and its vicinity are returned directly to the oil cooler, with another portion of the oil—likewise through with heating - remaining within the circulating circuit. This results not only in enabling the heating/cooling unit of the present invention to exhibit improved cooling efficiency with the oil returning to the oil cooler, but also in practicality to provide a oil cooler capable of quickly cooling the oil sufficiently with the capacity rather reduced than increased.

Of further note is an arrangement that a flow direction changeover unit is contrived to flow the oil from a pump to a thermal medium return circuit leading to an oil reservoir while held at the neutral position, thus not requiring to circulate the oil in a manner that the oil may flow back to the oil reservoir via a relief circuit installed with a relief valve, unlike the conventionality. This results in enabling to circulate the oil with no time of wait until the oil pressure goes up to a setpoint of the relief valve as is the case with the conventionality, whereby it becomes feasible to save the energy of electricity to drive the oil pump.

Further, between the oil heater and the flow direction changeover unit, there is provided the second oil pump, whereby a shift from the heating process to the cooling process entails no trouble of flowing back the hot oil thus far in the oil heater to the cooler via the flow direction changeover unit. This results in practicality to raise the efficiency of oil cooling.

Further, the bearings rotatably supporting the drive shaft which couples together the second oil pump, and the thermal medium pressurizing motor to drive thereof are provided with an oil cooler so that said bearings may receive a cool thermal medium, whereby it becomes able not only to prevent the bearings from being heated high but also to provide them with long periodic, stabilized functional serviceability, and practicability as well to improve maintenability of the bearings.

As is clear from the above, the present invention can provide a heating/cooling unit which is characterized by excellent efficiency of heating and cooling oil applied as a thermal medium so that said unit is allowed to undertake quickly heating and cooling a set of dies, whereby the cycle time of injection molding may be cut short with availability of a quicker timing to take out each molded product.

What is claimed is:

1. A heating and cooling unit devised capable of selectively heating or cooling a set of dies by introducing a thermal medium into an in-die fluid path formed for said dies, comprising:

thermal medium storage means to contain the thermal medium therein;

first pump means to suck up the thermal medium from said thermal storage means, and discharge thereof;

a first thermal medium path pipe which delivers therethrough the thermal medium out from said first pump means;

flow direction changeover valve means with first, second, third, and fourth ports, which in a standby mode preceding a die set heating mode, and wherein said first thermal medium path pipe is coupled to said first port, delivers to said second port the thermal medium discharged from said first pump means, with said first and second ports held in fluid communication with each other, in the die set heating mode, delivers to said third port the thermal medium discharged from said first pump means, with said first and third ports kept in fluid communication with each other, and in a die set cooling mode, delivers to said fourth port the thermal medium discharged from said first pump means, with said first and fourth ports maintained in fluid communication with each other;

a first thermal medium return pipe connected to said second port of said flow direction changeover valve to return the thermal medium to said thermal medium storage means;

cooling means installed on said first thermal medium return pipe to cool the thermal medium prior to return to said thermal medium storage means;

a second thermal medium path pipe coupled to said third port of said flow direction changeover valve means to deliver therethrough the thermal medium from said flow direction changeover valve means;

second pump means coupled to said flow direction changeover valve means via said second thermal medium path pipe, and which in the heating mode, sucks up and discharges the thermal medium from said flow direction changeover valve means;

a third thermal medium path pipe delivering the thermal medium out from said second pump means into the in-die fluid path of said dies;

first check valve means installed on said third thermal medium path pipe to prevent a flow of the thermal medium from said dies;

heating means installed on said third thermal medium path pipe extending between said first check valve means and said second pump means;

a fourth thermal medium path pipe to couple together said fourth port of said flow direction changeover valve means, and the in-die fluid path of said dies;

second check valve means installed on said fourth thermal medium path pipe to prevent a flow of the thermal medium from said dies;

a second thermal medium return pipe coupled to said first thermal medium return pipe to deliver therethrough the thermal medium out from the in-die fluid path of said dies;

opening and closing switching means installed on said second thermal medium return pipe to prevent a flow of the thermal medium in the heating mode with a closing cycle on, and release a flow of the thermal medium in the cooling mode with an opening cycle on;

a fifth thermal medium path pipe to couple said second thermal medium return pipe running between said in-die fluid path of said dies, and said opening and closing switching means to the inlet of said second pump means provided in said second thermal medium path pipe; and control means to control in the die set heating mode said flow direction changeover valve means, second pump means, and opening and closing switching means in a manner to set up a thermal medium circulating circuit with said second pump means, said heating means, said first check valve means, said in-die fluid path of said dies, and said fifth thermal medium path pipe connected together in a heating mode.

2. The heating and cooling unit according to claim 1, further comprising:

check valve means to prevent a flow of the thermal medium toward said flow direction changeover valve means coupled to said second thermal medium path pipe running therefrom to said fifth thermal medium path pipe.

3. A heating and cooling unit devised capable of selecting heating or cooling a set of dies by introducing a thermal medium into an in-die fluid path of said dies, comprising:

thermal medium storage means;

first pump means to suck up the thermal medium from said thermal medium storage means;

a first thermal medium path pipe which delivers therethrough the thermal medium out from said pump means;

flow direction changeover valve means with first, second, third, and fourth ports, which in a standby mode preceding a die set heating mode, and wherein said first thermal medium path pipe is coupled to said first port, delivers to said second port the thermal medium discharged from said first pump means, with said first and second ports held in fluid communication with each other, in the die set heating mode, delivers to said third port the thermal medium discharged from said first pump means, with said first and third ports kept in fluid communication with each other, and in a die set cooling mode, delivers to said fourth port the thermal medium discharged from said first pump means, with said first and fourth ports maintained in fluid communication with each other;

a first thermal medium return pipe coupled to said second port of said flow direction changeover valve means to flow back the thermal medium to said thermal medium storage means;

cooling means installed on said first thermal medium return pipe to cool the thermal medium prior to return to said thermal medium storage means;

a second thermal medium path pipe coupled to said third port of said flow direction changeover valve means to deliver therethrough the thermal medium from said flow direction changeover valve means;

a thermal medium pressurizing motor coupled to said third port of said flow direction changeover valve means for fluid communication therewith via said second thermal medium path pipe, and driven with the pressure of the thermal medium in said second thermal medium path pipe;

second pump means driven by said thermal medium pressurizing motor;

a third thermal medium path pipe to deliver the thermal medium from the in-die fluid path of said dies to said second pump means;

a fourth thermal medium path pipe to deliver to said cooling means the thermal medium from said thermal medium pressurizing motor;

a fifth thermal medium path pipe to deliver the thermal medium from said second pump means into the in-die fluid path of said dies;

first check valve means installed on said fifth thermal medium path pipe to prevent a flow of the thermal medium from said dies;

heating means installed on said fifth thermal medium path pipe extending between said first check valve means and said second pump means for thermal medium heating;

a sixth thermal medium path pipe to couple together said fourth port of said flow direction changeover valve means, and said in-die fluid path of said dies for fluid communication with each other;

second check valve means installed on said sixth thermal medium path pipe to prevent a flow of the thermal medium from said dies;

a second thermal medium return pipe coupled to said first thermal medium return pipe to deliver the thermal medium from said in-die fluid path of said dies to said cooling means;

opening and closing switching means installed on said second thermal medium return pipe to close said pipe in a heating mode thereby to prevent a flow of the thermal medium, and open said pipe in a cooling mode to release a flow of the thermal medium; and control means to control said flow direction changeover valve means, said second pump means, and said opening and closing switching means in a manner to set up a thermal means circulating circuit with said second pump means, said heating means, said first check valve means, said in-die fluid path of said dies, and third medium path pipe coupled together in a die set heating mode.

4. The heating and cooling unit according to claim 3, further comprising:

third check valve means installed on said third thermal medium path pipe running between said second pump means and said cooling means to prevent a flow of the thermal medium to said cooling means.

5. A heating and cooling unit devised capable of selectively heating or cooling a set of dies by introducing a thermal medium into an in-die fluid path formed for said dies, comprising:

thermal medium storage means to contain the thermal medium therein;

first pump means to suck up and discharge the thermal medium from said thermal medium storage means;

flow direction changeover valve means with first, second, third, and fourth ports, which in a standby mode preceding a die set heating mode, and wherein said first thermal path pipe is coupled to said first port, delivers to said second port the thermal medium discharged from said first pump means, with said first and second ports held in fluid communication with each other, in the die set heating mode, delivers to said third port the thermal medium discharged from said first pump means, with said first and third ports kept in fluid communication with each other, and in a die set cooling mode, delivers to said fourth port the thermal medium discharged from said first pump means, with said firsts and fourth ports maintained in fluid communication with each other;

a first thermal medium return pipe coupled to said second port of said flow direction changeover valve means to flow back the thermal medium to said thermal medium storage means;

cooling means installed on said first thermal medium return pipe to cool the thermal medium prior to return to said thermal medium storage means;

a second thermal medium path pipe coupled to said fourth port of said flow direction changeover valve means to deliver therethrough the thermal medium from said flow direction changeover valve means;

a thermal medium pressurizing motor coupled to said third port of said flow direction changeover valve means for fluid communication therewith via said second thermal medium path pipe, and driven with the pressure of the thermal medium;

second pump means driven by said thermal medium pressurizing means;

a third thermal medium path pipe to deliver the thermal medium from said in-die fluid path of said die to said second pump means;

a fourth thermal medium path pipe to deliver the thermal medium from said thermal medium pressurizing motor to said cooling means;

a fifth thermal medium path pipe to deliver the thermal medium from said second pump means into said in-die fluid path of said dies;

first check valve means installed on said fifth thermal medium path pipe to prevent a flow of the thermal medium from said dies;

heating means installed on said fifth thermal medium path pipe extending between said first check valve means and said second pump means for thermal medium heating;

a sixth thermal medium path pipe to couple said fourth port of said flow direction changeover valve means, and said in-die fluid path of said dies;

second check valve means installed on said sixth thermal medium path pipe to prevent a flow of the thermal medium from said dies;

a second thermal medium return pipe coupled to said first thermal medium return pipe to deliver the thermal medium from said in-die fluid path of said dies to said cooling means;

opening and closing switching means installed on said second thermal medium return pipe to prevent a flow of the thermal medium with said return pipe closed in the heating mode, and release a flow of the thermal medium with said return pipe opened in the heating mode;

control means to control said flow direction changeover valve means, said second pump means and, said opening and closing switching means in a manner to set up a thermal medium circulating circuit with said second pump means, said heating means, said first check valve, said in-die fluid path of said die set, and third medium path pipe coupled together in the die set heating mode;

second cooling means to cool bearings which rotatably support a drive shaft coupling said second pump means to said thermal medium pressurizing motor;

third pump means to suck up and discharge the thermal medium from said thermal medium storage means;

a seventh thermal medium path pipe to deliver the thermal medium for use in bearing cooling to said cooling means with said third pump means and said second cooling means coupled together for fluid communication with each other; and a third thermal medium return pipe to flow back the thermal medium from said second cooling means to said first cooling means.

6. The heating/cooling unit according to claim 5, further comprising:

third check valve means installed on said third thermal medium path pie running between said second pump means and cooling means.

* * * * *